United States Patent
Amishima et al.

(10) Patent No.: US 10,416,277 B2
(45) Date of Patent: Sep. 17, 2019

(54) POSITIONING DEVICE

(71) Applicant: Mitsubishi Electric Corporation, Tokyo (JP)

(72) Inventors: Takeshi Amishima, Tokyo (JP); Toshio Wakayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 309 days.

(21) Appl. No.: 15/126,764

(22) PCT Filed: Apr. 21, 2014

(86) PCT No.: PCT/JP2014/061179
§ 371 (c)(1),
(2) Date: Sep. 16, 2016

(87) PCT Pub. No.: WO2015/162669
PCT Pub. Date: Oct. 29, 2015

(65) Prior Publication Data
US 2017/0090009 A1    Mar. 30, 2017

(51) Int. Cl.
*G01S 3/02* (2006.01)
*G01S 5/06* (2006.01)
(Continued)

(52) U.S. Cl.
CPC .............. *G01S 5/06* (2013.01); *G01S 5/0273* (2013.01); *G01S 5/0215* (2013.01); *G01S 19/21* (2013.01); *G01S 19/22* (2013.01)

(58) Field of Classification Search
CPC ........ G01S 5/06; G01S 5/0215; G01S 5/0273; G01S 19/21; G01S 19/22
(Continued)

(56) References Cited

U.S. PATENT DOCUMENTS 6,121,926 A * 9/2000 Belcher ................... G01S 1/042
342/450
7,911,385 B2 * 3/2011 Heuser .................. G01S 5/0273
342/450
(Continued)

FOREIGN PATENT DOCUMENTS

| JP | 11-326484 A | 11/1999 |
|----|----|----|
| JP | 2006-023267 A | 1/2006 |
| JP | 2014-044160 A | 3/2014 |

OTHER PUBLICATIONS

The extended European search report issued by the European Patent Office dated Nov. 22, 2017, which corresponds to European Patent Application No. 14890073.1-1812 and is related to U.S. Appl. No. 15/126,764.
(Continued)

*Primary Examiner* — Chuong P Nguyen
(74) *Attorney, Agent, or Firm* — Studebaker & Brackett PC

(57) ABSTRACT

A configuration is provided, including a determination processor 5 that determines, using the values $TDOA_{11,i}$ and $TDOA_{22,j}$ calculated by an autocorrelation processor 4, whether the values $TDOA_{12,k}$ calculated by a cross-correlation processor 3 are time differences of arrival resulting from direct waves emitted from a radio source, and a positioning processor 6 that calculates the location of the radio source, using the values $TDOA_{12,k}$ that are determined by the determination processor 5 as being time differences of arrival resulting from direct waves and selected from among the values $TDOA_{12,k}$ calculated by the cross-correlation processor 3.

5 Claims, 17 Drawing Sheets

(51) Int. Cl.
  *G01S 5/02* (2010.01)
  *G01S 19/21* (2010.01)
  *G01S 19/22* (2010.01)

(58) Field of Classification Search
  USPC .............................. 342/453, 357.59, 357.61
  See application file for complete search history.

(56) References Cited

U.S. PATENT DOCUMENTS

| | | | | |
|---|---|---|---|---|
| 8,314,736 | B2* | 11/2012 | Moshfeghi | H04W 4/029 342/465 |
| 8,878,721 | B2* | 11/2014 | Werner | G01S 19/46 342/357.29 |
| 9,400,323 | B2* | 7/2016 | Suwa | G01S 13/46 |
| 9,407,318 | B2* | 8/2016 | Tangudu | G01S 19/21 |
| 9,507,007 | B2* | 11/2016 | Markhovsky | G01S 3/74 |
| 9,829,560 | B2* | 11/2017 | Moshfeghi | H04W 64/006 |
| 10,020,854 | B2* | 7/2018 | Hadani | H04L 27/2639 |
| 10,091,754 | B2* | 10/2018 | Miller | H04W 56/0095 |
| 10,281,560 | B2* | 5/2019 | Xue | G01S 5/10 |
| 2005/0281363 | A1 | 12/2005 | Qi et al. | |
| 2010/0007558 | A1 | 1/2010 | Bent et al. | |
| 2018/0313930 | A1* | 11/2018 | Chrabieh | G01S 5/0215 |

OTHER PUBLICATIONS

Jan Scheuing et al., "Disambiguation of TDOA Estimates in Multi-Path Multi-Source Environments (DATEMM)", 2006 IEEE International Conference on Acoustics, Speech and Signal Processing (ICASSP); May 14-19, 2006, vol. 4, pp. 837-840, Piscataway, NJ, U.S.

John L. Spiesberger, "Identifying cross-correlation peaks due to multipaths with application to optimal passive localization of transient signals and tomographic mapping of the environment", The Journal of the Acoustical Society of America, American Institute of Physics for the Acoustical Society of America, New York, NY, U.S., vol. 100, No. 2, Part 1, Aug. 1, 1996, pp. 910-917.

International Search Report issued in PCT/JP2014/061179; dated Jun. 10, 2014.

Delosme et al.; Source location from time differences of arrival: Identifiability and estimation; Acoustics, Speech, and Signal Processing; IEEE International Conference on ICASSP; 1980; pp. 818-824; vol. 5; California, USA.

Lategahn et al.; TDoA and RSS based Extended Kalman Filter for Indoor Person Localization; IEEE 78th Vehicular Technology Conference; 2013; pp. 1-5; Dortmund, Germany.

Scheuing et al.; Disambiguation of TDOA Estimates in Multi-Path Multi-Source Environments (DATEMM); Proceedings of 2006 IEEE International Conference on Acoustics; Speech and Signal Processing; May 2006; pp. 837-840; vol. 4; Stuttgart, Germany.

* cited by examiner

FIG.7

| | Cross-Correlation 12 | Cross-Correlation 23 | Cross-Correlation 31 |
|---|---|---|---|
| TDOA Value | TDOA_true{1,2}=−53.128[μsec]<br>TDOA_true{1,2}=−27.838[μsec] | TDOA_true{2,3}=−42.319[μsec]<br>TDOA_true{2,3}=27.220[μsec] | TDOA_true{3,1}=95.447[μsec]<br>TDOA_true{3,1}=0.618[μsec] |

TDOA Values Resulting from Correct Direct Waves

FIG.8

All of Detected TDOA Values and TDOAs Resulting from Direct Waves and Selected by Proposed Scheme

| | Cross-Correlation 12 | Cross-Correlation 23 | Cross-Correlation 31 |
|---|---|---|---|
| TDOA Value | All of Detected TDOAs 12<br>○TDOA_12(1)=−27.892319[μsec]<br>○TDOA_12(2)=−53.093518[μsec]<br>×TDOA_12(3)=−76.440254[μsec] | All of Detected TDOAs 23<br>×TDOA_23(1)=−18.986220[μsec]<br>×TDOA_23(2)=−52.799651[μsec]<br>○TDOA_23(3)=27.173202[μsec]<br>○TDOA_23(4)=−42.293648[μsec] | All of Detected TDOAs 31<br>○TDOA_31(1)=0.679530[μsec]<br>×TDOA_31(2)=80.641042[μsec]<br>○TDOA_31(3)=95.400078[μsec] |

○: Direct Waves, ×: Multipath Waves

Cross-CorrelationCCF($x_1(t), x_2(t)$)

Cross-Correlation($x_2(t), x_3(t)$)

Time of $TDOA_{12,k}$ - $(TDOA_{11,i}$ - $TDOA_{22,j})$

Time of - $(TDOA_{11,i}$ - $TDOA_{22,j})$

FIG.21
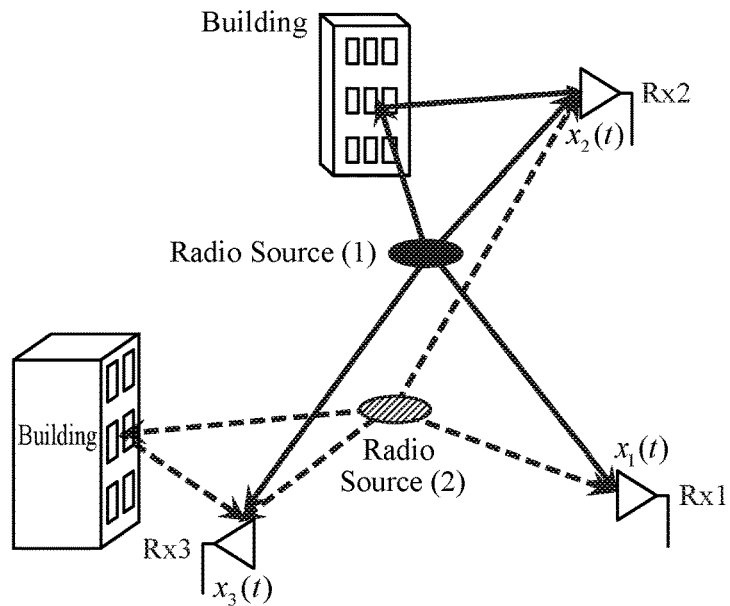
FIG.22
| Examples in Fig. 21 |
| Number of Radio Sources |
| Number of Receiving Sensors |
| Number of CCF($x_1$, $x_2$) TDOAs |
| Number of CCF($x_2$, $x_3$) TDOAs |
| Number of CCF($x_3$, $x_1$) TDOAs |
⇒ Select Two TDOAs Resulting from Direct Waves from Among Each Set of CCF TDOAs
FIG.23
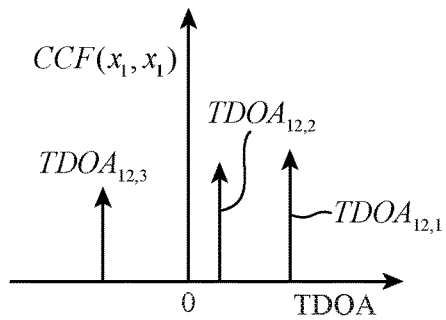
Example of Cross-Correlation Between $x_1$ and $x_2$
($TDOA_{12,k}$ (k=1,2,3))

POSITIONING DEVICE

TECHNICAL FIELD

The invention relates to a positioning device which computes the locations of unknown radio sources.

BACKGROUND ART

There is known a scheme for calculating the location of an unknown radio source by disposing receiving sensors that receive radio waves emitted from the unknown radio source, at a plurality of locations, and for measuring time differences of arrival of the radio waves received by the plurality of receiving sensors.

This positioning scheme is called TDOA (Time Difference Of Arrival) positioning, and is applicable not only to radio waves but also to waves such as acoustic waves and light.

In addition, for application fields, the positioning scheme can be applied to various applications such as not only outdoor positioning (e.g., urban areas, city areas, mountainous regions, valleys, seas) but also indoor positioning (e.g., houses, factories, malls, underground shopping malls, hospitals). In addition, the positioning scheme is also applicable to positioning of spacecraft in the space field, and radio source positioning that uses a spacecraft or the like as a receiving sensor.

Conventional TDOA positioning will be described.

FIG. 20 is an illustrative diagram showing an overview of TDOA positioning disclosed in the following Non-Patent Literature 1.

In the example of FIG. 20, three receiving sensors Rx1, Rx2, and Rx3 receive radio waves emitted from an unknown radio source. Since distances from the unknown radio source to the three receiving sensors Rx1, Rx2, and Rx3 differ from each other, the radio waves emitted from the unknown radio source reach the receiving sensors Rx1, Rx2, and Rx3 after the passage of periods of time that are determined according to the distances to the three receiving sensors Rx1, Rx2, and Rx3.

Hence, for example, by calculating the cross-correlation CCF ($x_1(t)$, $x_2(t)$) between a received signal $x_1(t)$ of the receiving sensor Rx1 and a received signal $x_2(t)$ of the receiving sensor Rx2, a $TDOA_{12}$ which is a time difference of arrival between the receiving sensor Rx1 and the receiving sensor Rx2 can be obtained based on the cross-correlation CCF ($x_1(t)$, $x_2(t)$).

In this regard, t represents discrete time where AD (Analog to Digital) sampling is performed. Therefore, the received signals $x_1(t)$ and $x_2(t)$ are AD-sampled discrete-time signals.

Likewise, by calculating the cross-correlation CCF ($x_3(t)$, $x_1(t)$) between a received signal $x_3(t)$ of the receiving sensor Rx3 and the received signal $x_1(t)$ of the receiving sensor Rx1, the value $TDOA_{31}$ which is a time difference of arrival between the receiving sensor Rx3 and the receiving sensor Rx1 can be obtained.

If the value $TDOA_{12}$ which is a time difference of arrival between the receiving sensor Rx1 and the receiving sensor Rx2 and the value $TDOA_{31}$ which is a time difference of arrival between the receiving sensor Rx3 and the receiving sensor Rx1 can be obtained in the above-described manner, then as shown in FIG. 20, by performing a publicly known positioning computation process that uses the two values $TDOA_{12}$ and $TDOA_{31}$, the location of the unknown radio source can be calculated.

Although in the example of FIG. 20 the radio waves emitted from the unknown radio source are received as direct waves by the three receiving sensors Rx1, Rx2, and Rx3, radio waves emitted from the unknown radio source may be reflected by buildings and the like, and then reach the receiving sensors. Such radio waves are called multipath waves.

Since the TDOA positioning disclosed in the following Non-Patent Literature 1 does not assume the reception of multipath waves by the three receiving sensors Rx1, Rx2, and Rx3, accuracy in calculating the location of the radio source degrades under an environment where multipath waves are received.

The following Non-Patent Literature 2 discloses a positioning device that calculates the location of a radio source with high accuracy even under an environment where multipath waves are received.

In this positioning device, when TDOAs resulting from a multipath wave are obtained in addition to TDOAs resulting from direct waves, the unnecessary TDOAs resulting from a multipath wave are eliminated using the measurement values of received signal strength (RSS), and the location of an unknown radio source is calculated based the remaining TDOAs resulting from direct waves.

Note, however, that in the positioning device disclosed in the following Non-Patent Literature 2, it is premised that there is one unknown radio source and the number of arrival waves which are direct waves is one. Hence, under an environment where there are two or more unknown radio sources, unnecessary TDOAs resulting from a multipath wave cannot be eliminated in principle.

FIG. 21 is an illustrative diagram showing an example of an environment where direct waves and multipath waves that are emitted from two radio sources (1) and (2) interfere with each other.

FIG. 22 is an illustrative diagram showing the number of TDOAs obtained by cross-correlation computation between received signals of receiving sensors of FIG. 21.

FIG. 23 is an illustrative diagram showing an example of the cross-correlation CCF($x_1(t)$, $x_2(t)$) between a received signal $x_1(t)$ of a receiving sensor Rx1 and a received signal $x_2(t)$ of a receiving sensor Rx2.

In the example of FIG. 21, the receiving sensor Rx2 receives a received signal $x_2(t)$ where a direct wave and a multipath wave that are emitted from the radio source (1) interfere with each other. In addition, a receiving sensor Rx3 receives a received signal $x_3(t)$ where a direct wave and a multipath wave that are emitted from the radio source (2) interfere with each other.

As a result, when the cross-correlation CCF($x_1(t)$, $x_2(t)$) between the received signal $x_1(t)$ of the receiving sensor Rx1 and the received signal $x_2(t)$ of the receiving sensor Rx2 is calculated, as shown in FIG. 23, three correlation peaks (the three values $TDOA_{12,k}$ (k=1, 2, and 3)) are obtained. The subscript "12" of the TDOAs indicates that the TDOAs are related to the receiving sensor Rx1 and receiving sensor Rx2, and "k" is the number assigned in turn to the TDOAs.

Likewise, when the cross-correlation CCF($x_2(t)$, $x_2(t)$) between the received signal $x_2(t)$ of the receiving sensor Rx2 and the received signal $x_3(t)$ of the receiving sensor Rx3 is calculated, four correlation peaks (the four values $TDOA_{23,k}$ (k=1, 2, 3, and 4)) are obtained, and when the cross-correlation CCF($x_3(t)$, $x_1(t)$) between the received signal $x_3(t)$ of the receiving sensor Rx3 and the received signal $x_1(t)$ of the receiving sensor Rx1 is calculated, three correlation peaks (the three values $TDOA_{31,k}$ (k=1, 2, and 3)) are obtained.

In the example of FIG. 21, despite the fact that the number of the radio sources (1) and (2) is two, a larger number of TDOAs than the number of radio sources are obtained.

Namely, since TDOAs resulting from a multipath wave are obtained in addition to TDOAs resulting from direct waves, a larger number of TDOAs than the number of radio sources are obtained.

If positioning computation for the radio sources (1) and (2) is erroneously performed using unnecessary TDOAs resulting from a multipath wave, positioning cannot be performed properly, and thus, there is a need to eliminate the unnecessary TDOAs resulting from a multipath wave. However, as described above, the positioning device disclosed in Non-Patent Literature 2 cannot eliminate, in principle, unnecessary TDOAs resulting from a multipath wave under an environment where there two or more unknown radio sources.

CITATION LIST

Non-Patent Literatures

Non-Patent Literature 1: Delosme, J., Morf, M., and Friedlander, B. "Source location from time differences of arrival: Identifiability and estimation" Acoustics, Speech, and Signal Processing, IEEEInternationalConferenceonICASSP, Volume: 5, Page(s): 818-824, 1980.

Non-Patent Literature 2: Julian Lategahn, Marcel Müller, Christof Rohrig, "TDoA and RSS based Extended Kalman Filter for Indoor Person Localization," 2013 IEEE 78th Vehicular Technology Conference, p 1-p 5, 2013.

SUMMARY OF INVENTION

Technical Problem

Since the conventional positioning device is configured in the above-described manner, if there is one unknown radio source and the number of arrival waves which are direct waves is one, then unnecessary TDOAs resulting from a multipath wave can be eliminated. However, under an environment where there are two or more unknown radio sources, unnecessary TDOAs resulting from multipath waves cannot be eliminated, causing the problem that the calculation of the location of the radio sources may not be able to be performed accurately.

The invention is made to solve problems such as that described above, and an object of the invention is to obtain a positioning device capable of calculating, even under an environment where there are two or more unknown radio sources, the locations of the radio sources with high accuracy, using TDOAs resulting from direct waves.

Solution to Problem

A positioning device according to the invention includes: a plurality of antennas including first and second antennas to receive signals in each of which a direct wave and a multipath wave interfere with each other, the direct wave and the multipath wave being emitted from a radio source; a first time-difference-of-arrival calculator to calculate time differences of arrival between signal waves being contained in the first and second received signals, based on a cross-correlation between a first received signal received by the first antenna and a second received signal received by the second antenna; a second time-difference-of-arrival calculator to calculate a time difference of arrival between signal waves being contained in the first received signal, based on an autocorrelation of the first received signal and to calculate a time difference of arrival between signal waves being contained in the second received signal, based on an autocorrelation of the second received signal; a determiner to determine, using a difference between the time difference of arrival calculated based on the autocorrelation of the first received signal by the second time-difference-of-arrival calculator and the time difference of arrival calculated based on the autocorrelation of the second received signal by the second time-difference-or-arrival calculator, whether the time differences of arrival calculated by the first time-difference-of-arrival calculator are time differences of arrival resulting from direct waves emitted from the radio source; and a location calculator to calculate a location of the radio source, using the time differences of arrival determined by the determiner as being the time differences of arrival resulting from the direct waves and selected from among the time differences of arrival calculated by the first time-difference-of-arrival calculator.

Advantageous Effects of Invention

According to the invention, it is configured such that the determiner is provided which determines, using the difference between time differences of arrival calculated by the second time-difference-of-arrival calculator, whether time differences of arrival calculated by the first time-difference-of-arrival calculator are time differences of arrival resulting from direct waves emitted from a radio source. The location calculator calculates the location of the radio source, using time differences of arrival that are determined by the determiner as being time differences of arrival resulting from direct waves and selected from among the time differences of arrival calculated by the first time-difference-of-arrival calculator. Thus, there is the effect of being able to calculate, even under an environment where there are unknown radio sources, the location of the radio sources with high accuracy, using time differences of arrival resulting from direct waves.

BRIEF DESCRIPTION OF DRAWINGS

FIG. 7 is an illustrative diagram showing the values of TDOAs resulting from direct waves.

FIG. 8 is an illustrative diagram showing TDOAs obtained by cross-correlation computation and TDOAs resulting from direct waves that are selected in the present invention.

FIG. 21 is an illustrative diagram showing an example of an environment where direct waves and multipath waves that are emitted from two radio sources (1) and (2) interfere with each other.

FIG. 22 is an illustrative diagram showing the number of TDOAs obtained by cross-correlation computation between received signals of receiving sensors of FIG. 21.

FIG. 23 is an illustrative diagram showing an example of cross-correlation $CCF(x_1(t), x_2(t))$ between a received signal $x_1(t)$ of a receiving sensor Rx1 and a received signal $x_2(t)$ of a receiving sensor Rx2.

DESCRIPTION OF EMBODIMENTS

Embodiments of the invention will be described in detail below with reference to the drawings.

First Embodiment

Figure 1:
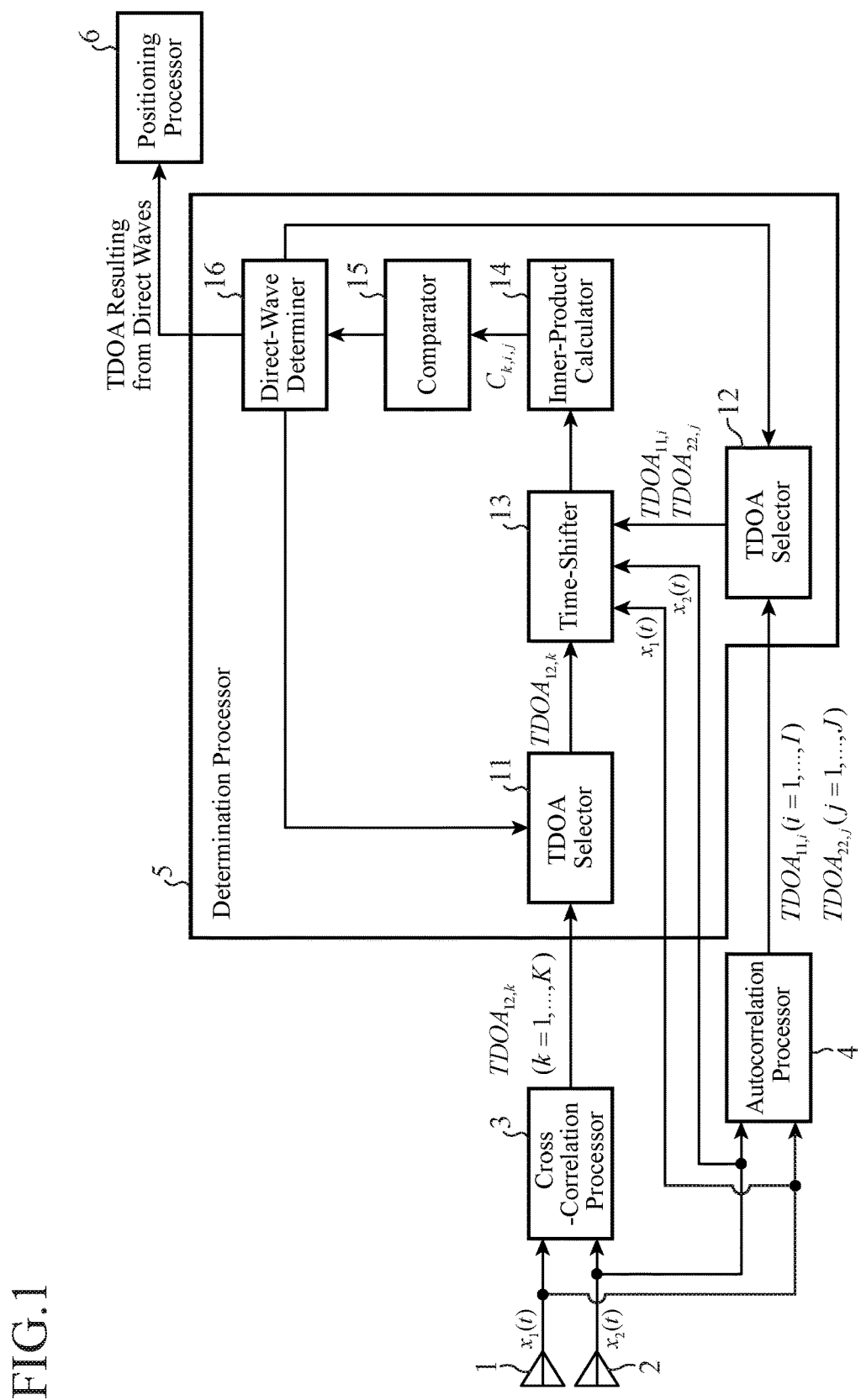
FIG. 1 is a configuration diagram showing a positioning device according to a first embodiment of the invention.

FIG. 1 is a configuration diagram showing a positioning device according to a first embodiment of the invention.

In FIG. 1, an antenna 1 which is a first antenna receives a signal (e.g., radio waves, acoustic waves, light, and the like) where a direct wave and a multipath wave that are emitted from an unknown radio source interfere with each other, and outputs the received signal $x_1(t)$.

An antenna 2 which is a second antenna receives a signal (e.g., radio waves, acoustic waves, light, and the like) where a direct wave and a multipath wave that are emitted from the unknown radio source interfere with each other, and outputs the received signal $x_2(t)$.

In this regard, t represents discrete time where AD sampling is performed. Therefore, the received signals $x_1(t)$ and $x_2(t)$ are AD-sampled discrete-time signals.

A cross-correlation processor 3 performs a process of calculating the cross-correlation $CCF(x_1(t), x_2(t))$ between the received signal $x_1(t)$ of the antenna 1 and the received signal $x_2(t)$ of the antenna 2 and calculating, based on the cross-correlation $CCF(x_1(t), x_2(t))$, the values $TDOA_{12,k}$ ($k=1, \ldots, K$) which are time differences of arrival between signal waves (a direct wave and a multipath wave) contained in the received signal $x_1(t)$ and signal waves (a direct wave and a multipath wave) contained in the received signal $x_2(t)$. Note that the cross-correlation processor 3 composes a first time-difference-of-arrival calculator.

An autocorrelation processor 4 performs a process of calculating the autocorrelation $ACF(x_1(t), x_1(t))$ of the received signal $x_1(t)$ of the antenna 1 and calculating, based on the autocorrelation $ACF(x_1(t), x_1(t))$, the values $TDOA_{11,i}$ ($i=1, \ldots, I$) which are time differences of arrival between signal waves (a direct wave and a multipath wave) contained in the received signal $x_1(t)$.

In addition, the autocorrelation processor 4 performs a process of calculating the autocorrelation $ACF(x_2(t), x_2(t))$ of the received signal $x_2(t)$ of the antenna 2 and calculating, based on the autocorrelation $ACF(x_2(t), x_2(t))$, the values $TDOA_{22,j}$ ($j=1, \ldots, J$) which are time differences of arrival between signal waves (a direct wave and a multipath wave) contained in the received signal $x_2(t)$. Note that the autocorrelation processor 4 composes a second time-difference-of-arrival calculator.

A determination processor 5 performs a process of determining, using the values $TDOA_{11,i}$ and $TDOA_{22,j}$ calculated by the autocorrelation processor 4, whether the values $TDOA_{12,k}$ calculated by the cross-correlation processor 3 are time differences of arrival resulting from direct waves that are emitted from the radio source. Note that the determination processor 5 composes a determiner.

A positioning processor 6 performs a process of calculating the location of the radio source, using the values $TDOA_{12,k}$ that are determined by the determination processor 5 to be time differences of arrival resulting from direct waves and selected from among the values $TDOA_{12,k}$ calculated by the cross-correlation processor 3. In this regard, the positioning processor 6 is configured to have a location calculator.

A TDOA selector 11 performs a process of selecting an arbitrary $TDOA_{12,k}$ that has not yet been selected, from among the K values $TDOA_{12,k}$ ($k=1, \ldots, K$) calculated by the cross-correlation processor 3.

A TDOA selector 12 performs a process of selecting an arbitrary $TDOA_{11,i}$ that has not yet been selected, from among the I values $TDOA_{11,i}$ ($i=1, \ldots, I$) calculated by the autocorrelation processor 4, and selecting an arbitrary $TDOA_{22,j}$ that has not yet been selected, from among the J values $TDOA_{22,j}$ ($j=1, \ldots, J$) calculated by the autocorrelation processor 4.

A time-shifting processor 13 performs a time-shifting process by shifting the received signal of the antenna 1 forward in time by the amount of time that is obtained by subtracting a difference ($TDOA_{11,i}-TDOA_{22,j}$) between the values $TDOA_{11,i}$ and $TDOA_{22,j}$ selected by the TDOA selector 12, from the value $TDOA_{12,k}$ selected by the TDOA selector 11, and performs a process of outputting to an inner-product calculator 14 the received signal $x_1(t+TDOA_{12,k}-(TDOA_{11,i}-TDOA_{22,j}))$ having been subjected to the time-shifting process and the received signal $x_2(t)$ of the antenna 2.

Note that the TDOA selectors 11 and 12 and the time-shifting processor 13 compose a time shifter.

The inner-product calculator 14 performs a process of calculating an inner product $C_{k,i,j}$ between the received signal $x_1(t+TDOA_{12,k}-(TDOA_{11,i}-TDOA_{22,j}))$ having been subjected to the time-shifting process and the received signal $x_2(t)$ of the antenna 2, which are outputted from the time-shifting processor 13.

A comparison processor 15 performs a process of comparing the inner product $C_{k,i,j}$ calculated by the inner-product calculator 14 with a preset threshold value $C_{th}$.

A direct-wave determiner 16 determines that the value $TDOA_{12,k}$ selected by the TDOA selector 11 is a time difference of arrival resulting from direct waves emitted from the radio source, when a result of a comparison made by the comparison processor 15 shows that the inner product $C_{k,i,j}$ is smaller than the threshold value $C_{th}$ for all combinations of the values $TDOA_{11,i}$ and $TDOA_{22,j}$ selected by the TDOA selector 12.

Note that the comparison processor 15 and the direct-wave determiner 16 compose a determining unit.

Although in the example of FIG. 1 it is assumed that each of the antennas 1 and 2, the cross-correlation processor 3, the autocorrelation processor 4, the determination processor 5, and the positioning processor 6 which are components of the positioning device is composed of dedicated hardware (e.g., components other than the antennas 1 and 2 are a semiconductor integrated circuit or single-chip microcomputer having a CPU mounted thereon), the components other than the antennas 1 and 2 may be composed of a computer.

When the components other than the antennas 1 and 2 are composed of a computer, a program that describes processing content of the cross-correlation processor 3, the auto-correlation processor 4, the determination processor 5, and the positioning processor 6 may be stored in a memory of the computer, and a CPU of the computer may execute the program stored in the memory.

Figure 2:
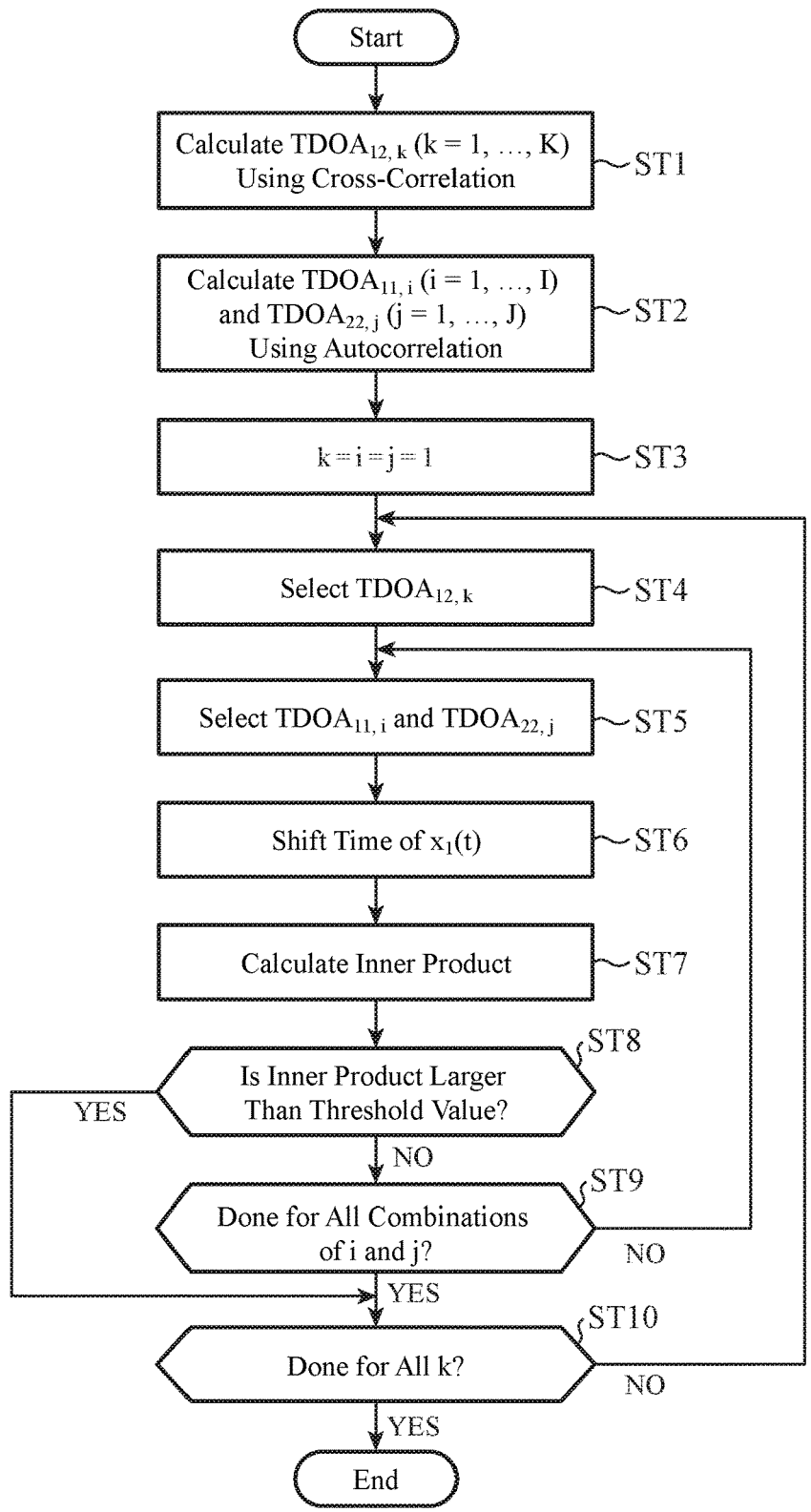
FIG. 2 is a flowchart showing processing content of the positioning device according to the first embodiment of the invention.

FIG. 2 is a flowchart showing processing content of the positioning device according to the first embodiment of the invention.

Next, an operation will be described.

The antenna 1 which is a receiving sensor receives a signal (e.g., radio waves, acoustic waves, light, and the like.) where a direct wave and a multipath wave that are emitted from an unknown radio source interfere with each other, and outputs the received signal $x_1(t)$ to the cross-correlation processor 3 and the autocorrelation processor 4.

In addition, the antenna 2 which is a receiving sensor receives a signal (e.g., radio waves, acoustic waves, light, and the like) where a direct wave and a multipath wave that are emitted from the unknown radio source interfere with each other, and outputs the received signal $x_2(t)$ to the cross-correlation processor 3 and the autocorrelation processor 4.

When the cross-correlation processor 3 receives the received signal $x_1(t)$ of the antenna 1 and the received signal $x_2(t)$ of the antenna 2, the cross-correlation processor 3 calculates cross-correlation $CCF(x_1(t), x_2(t))$ between the received signal $x_1(t)$ and the received signal $x_2(t)$. A cross-correlation calculation process itself is a publicly known technique and thus a detailed description thereof is omitted.

When the cross-correlation processor 3 calculates the cross-correlation $CCF(x_1(t), x_2(t))$, the cross-correlation processor 3 searches for peak values of the cross-correlation $CCF(x_1(t), x_2(t))$ and outputs times corresponding to the peak values to the determination processor 5, as time differences of arrival ($TDOA_{12,k}$ (k=1, ..., K)) between signal waves (a direct wave and a multipath wave) contained in the received signal $x_1(t)$ and signal waves (a direct wave and a multipath wave) contained in the received signal $x_2(t)$ (step ST1).

When the autocorrelation processor 4 receives the received signal $x_1(t)$ of the antenna 1 and the received signal $x_2(t)$ of the antenna 2, the autocorrelation processor 4 calculates the autocorrelation $ACF(x_1(t), x_1(t))$ of the received signal $x_1(t)$ of the antenna 1, and calculates the autocorrelation $ACF(x_2(t), x_2(t))$ of the received signal $x_2(t)$ of the antenna 2. An autocorrelation calculation process itself is a publicly known technique and thus a detailed description thereof is omitted.

When the autocorrelation processor 4 calculates the autocorrelation $ACF(x_1(t), x_1(t))$ of the received signal $x_1(t)$ of the antenna 1, the autocorrelation processor 4 searches for peak values of the autocorrelation $ACF(x_1(t), x_1(t))$ and outputs times corresponding to the peak values to the determination processor 5, as time differences of arrival ($TDOA_{11,i}$ (i=1, ..., I)) between signal waves (a direct wave and a multipath wave) contained in the received signal $x_1(t)$ (step ST2).

In addition, the autocorrelation processor 4 searches for peak values of the autocorrelation $ACF(x_2(t), x_2(t))$ of the received signal $x_2(t)$ of the antenna 2 and outputs times corresponding to the peak values to the determination processor 5, as time differences of arrival ($TDOA_{22,j}$ (j=1, ..., J)) between signal waves (a direct wave and a multipath wave) contained in the received signal $x_2(t)$ (step ST2).

Figure 3:
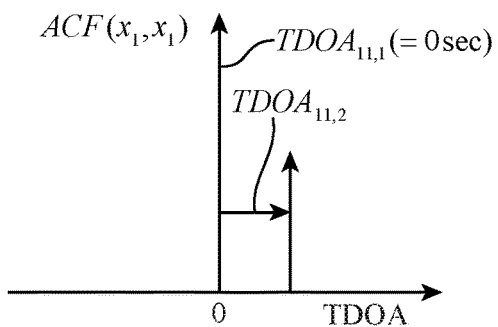
FIG. 3 is an illustrative diagram showing an example of autocorrelation for a case in which there is one multipath wave which is a reflected wave.

Here, FIG. 3 is an illustrative diagram showing an example of an autocorrelation for a case in which there is one multipath wave which is a reflected wave.

Figure 4:
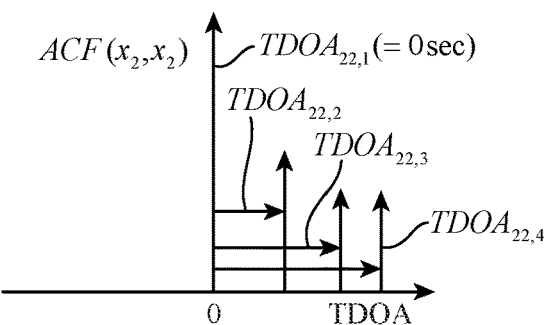
FIG. 4 is an illustrative diagram showing an example of autocorrelation for a case in which there are two multipath waves which are reflected waves.

In addition, FIG. 4 is an illustrative diagram showing an example of an autocorrelation for a case in which there are two multipath waves which are reflected waves.

In this regard, FIGS. 3 and 4 only show TDOAs greater than or equal to 0 since the autocorrelation ACF is bilaterally symmetric.

Figure 5:
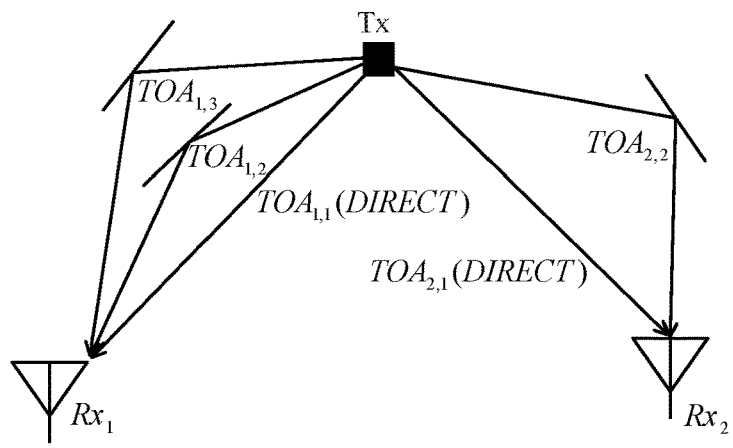
FIG. 5 is an illustrative diagram showing an example of time of arrival of direct waves and multipath waves that are emitted from a radio source.

FIG. 5 is an illustrative diagram showing an example of time of arrival of direct waves and multipath waves that are emitted from a radio source.

Although here an example in which there is one radio source is shown for simplification of description, even when there are two or more radio sources, the positioning device can be applied in the same manner.

As shown in FIGS. 3 and 4, of the TDOAs obtained based on the autocorrelation ACF, TDOAs resulting from direct waves have large peaks at a time of 0 sec.

In addition, TDOAs resulting from a multipath wave have large peaks at times other than 0 sec.

In the first embodiment, an environment where there are multipath waves is assumed. Hence, at least one of i and j is 2 or more, and it is assumed that the autocorrelation processor 4 obtains the values $TDOA_{11,i}$ (i=2, ..., I) and $TDOA_{22,j}$ (j=2, ..., J) having the values of delay in time of arrival of a multipath wave (time taken for a multipath wave to arrive after a direct wave arrives), in addition to the values $TDOA_{11,1}$ and $TDOA_{22,1}$.

A relationship between an autocorrelation and a cross-correlation is as follows:

(1) TDOA resulting from direct waves: $TDOA_{12,DIRECT}$ (2) TDOA resulting from a multipath wave: $TDOA_{12,MULTI}$ (3) Time of arrival of a signal at the antenna 1: $TOA_{1,a}$ (a=1, where the time of arrival resulting from a direct wave is $TOA_{1,1}$.

(4) Time of arrival of a signal at the antenna 2: $TOA_{2,b}$ (b=1, ..., B), where the time of arrival resulting from a direct wave is $TOA_{2,1}$.

At this time, for the value $TDOA_{12,MULTI}$ resulting from a multipath wave, there are the values $TDOA_{11,i}$ and $TDOA_{22,j}$ that satisfy the following equations (note that at least one of i and j is 2 or more):

$$TOA_{1,a} = TDOA_{11,i} + TOA_{1,1} \tag{1}$$

$$TOA_{2,b} = TDOA_{22,j} + TOA_{2,1} \tag{2}$$

$$TDOA_{12,DIRECT} = TOA_{1,1} - TOA_{2,1} \tag{3}$$

$$TDOA_{12,MULTI} = TOA_{1,a} - TOA_{2,b} \tag{4}$$

From equations (1) to (4), the following equation (5) holds true:

$$TDOA_{12,MULTI} - TDOA_{12,DIRECT} = TDOA_{11,i} - TDOA_{22,j} \tag{5}$$

When the cross-correlation processor 3 calculates K number of values $TDOA_{12,k}$ (k=1, ..., K) and the autocorrelation processor 4 calculates I number of values $TDOA_{11,i}$ (i=1, ..., I) and J number of values $TDOA_{22,j}$ (j=1, ..., J), the direct-wave determiner 16 in the determination processor 5 initializes variables k, i, and j to 1 (step ST3).

The TDOA selector 11 selects the k-th $TDOA_{12,k}$ that has not yet been selected, from among the K values $TDOA_{12,k}$ (k=1, ..., K) calculated by the cross-correlation processor 3 (step ST4). At this stage, k=1 and thus the value $TDOA_{12,1}$ is selected.

The TDOA selector 12 selects the i-th $TDOA_{11,i}$ that has not yet been selected, from among the I values $TDOA_{11,i}$ (i=1, ..., I) calculated by the autocorrelation processor 4 (step ST5). At this stage, i=1 and thus the value $TDOA_{11,1}$ is selected.

In addition, the TDOA selector 12 selects the j-th $TDOA_{22,j}$ that has not yet been selected, from among the J values $TDOA_{22,j}$ (j=1, ..., J) calculated by the autocorrelation processor 4 (step ST5). At this stage, j=1 and thus the value $TDOA_{22,1}$ is selected.

Here, considering a case in which the received signal $x_1(t)$ of the antenna 1 is shifted in time as shown in the following formula (6), if it is assumed that the value $TDOA_{12,k}$ selected by the TDOA selector 11 results from a multipath wave and the values $TDOA_{11,i}$ and $TDOA_{22,j}$ selected by the TDOA selector 12 each correspond to an amount of time delay from an arrival time of a direct wave, then from the above-described equation (5) the shift time $(TDOA_{12,k} - (TDOA_{11,i} - TDOA_{22,j}))$ for the received signal $x_1(t)$ of the antenna 1 matches the value $TDOA_{12,DIRECT}$ resulting from direct waves to the antennas 1 and 2, as shown in the following formula (7):

$$x_1(t + TDOA_{12,k} - (TDOA_{11,i} - TDOA_{22,j})) \tag{6}$$

$$x_1(t + TDOA_{12,k} - (TDOA_{11,i} - TDOA_{22,j})) = x_1(t + TDOA_{12,MULTI} - (TDOA_{12,MULTI} - TDOA_{12,DIRECT})) = x_1(t + TDOA_{12,DIRECT}) \tag{7}$$

Therefore, shifting the received signal $x_1(t)$ of the antenna 1 in time as shown in equation (6) is equivalent to the shift of the received signal $x_1(t)$ of the antenna 1 in time by the value $TDOA_{12,DIRECT}$ resulting from direct waves.

When the TDOA selector 11 selects the value $TDOA_{12,k}$ and the TDOA selector 12 selects the values $TDOA_{11,i}$ and $TDOA_{22,j}$, the time-shifting processor 13 calculates the shift time $(TDOA_{12,k} - (TDOA_{11,i} - TDOA_{22,j}))$ for the received signal $x_1(t)$ of the antenna 1, using the values $TDOA_{12,k}$, $TDOA_{11,i}$ and $TDOA_{22,j}$.

When the time-shifting processor 13 calculates the shift time $(TDOA_{12,k} - (TDOA_{11,i} - TDOA_{22,j}))$, the time-shifting processor 13 performs a time-shifting process by shifting the received signal $x_1(t)$ of the antenna 1 forward in time by the shift time, and outputs the received signal $x_1(t + TDOA_{12,k} - (TDOA_{11,i} - TDOA_{22,j}))$ having been subjected to the time-shifting process and the received signal $x_2(t)$ of the antenna 2 to the inner-product calculator 14 (step ST6).

When the inner-product calculator 14 receives the received signal $x_1(t + TDOA_{12,k} - (TDOA_{11,i} - TDOA_{22,j}))$ having been subjected to the time-shifting process and the received signal $x_2(t)$ of the antenna 2 which are outputted from the time-shifting processor 13, the inner-product calculator 14 calculates an inner product $C_{k,i,j}$ between the received signal $x_1(t + TDOA_{12,k} - (TDOA_{11,i} - TDOA_{22,j}))$ having been subjected to the time-shifting process and the received signal $x_2(t)$ of the antenna 2, as shown in the following equation (8) (step ST7):

$$C_{k,i,j} = \langle x_1(t + TDOA_{12,k} - (TDOA_{11,i} - TDOA_{22,j})) \cdot x_2(t) \rangle \tag{8}$$

In equation (8), when the value $TDOA_{12,k}$ selected by the TDOA selector 11 results from a multipath wave, as shown in the above-described equation (7), $x_1(t + TDOA_{12,k} - (TDOA_{11,i} - TDOA_{22,j}))$ corresponds to $x_1(t + TDOA_{12,DIRECT})$, and $x_1(t + TDOA_{12,DIRECT})$ is a signal where the received signal $x_1(t)$ is shifted in time by the value $TDOA_{12,DIRECT}$ resulting from direct waves, and thus, the inner product between the received signal $x_1(t + TDOA_{12,k} - (TDOA_{11,i} - TDOA_{22,j}))$ and the received signal $x_2(t)$ has a large value.

On the other hand, when the value $TDOA_{12,k}$ selected by the TDOA selector 11 results from direct waves, the inner product between the received signal $x_1(t + TDOA_{12,k} - (TDOA_{11,i} - TDOA_{22,j}))$ and the received signal $x_2(t)$ has a small value.

When the inner-product calculator 14 calculates the inner product $C_{k,i,j}$, the comparison processor 15 compares the inner product $C_{k,i,j}$ with a preset threshold value $C_{th}$, and outputs a result of the comparison to the direct-wave determiner 16 (step ST8).

When the result of the comparison outputted from the comparison processor 15 shows that the inner product $C_{k,i,j}$ is larger than the threshold value $C_{th}$, the direct-wave determiner 16 determines that the value $TDOA_{12,k}$ selected by the TDOA selector 11 is a time difference of arrival resulting from a multipath wave.

When the direct-wave determiner 16 determines that the value $TDOA_{12,k}$ selected by the TDOA selector 11 is a time difference of arrival resulting from a multipath wave, if the value of the variable k has not reached K yet (step ST10), the direct-wave determiner 16 increments the variable k by one and then outputs the variable k to the TDOA selector 11 and instructs to reselect the k-th $TDOA_{12,k}$.

By this, the TDOA selector 11 selects the k-th $TDOA_{12,k}$ that has not yet been selected, from among the K values $TDOA_{12,k}$ (k=1, ..., K) calculated by the cross-correlation processor 3, by which the processes at steps ST4 to ST8 are repeated.

When the result of the comparison outputted from the comparison processor 15 shows that the inner product $C_{k,i,j}$ is smaller than the threshold value $C_{th}$, there is the possibility that the value $TDOA_{12,k}$ selected by the TDOA selector 11 is a time difference of arrival resulting from direct waves emitted from the radio source. Thus, if the value of the variable j has not reached J yet, the direct-wave determiner 16 increments the variable j by one and then outputs the variable i and the variable j to the TDOA selector 12 and instructs to reselect the i-th $TDOA_{11,i}$ and the j-th $TDOA_{22,j}$.

On the other hand, if the value of the variable j has already reached J, the variable j is initialized to 1 and the variable i is incremented by one and then the variable i and the variable j are outputted to the TDOA selector 12 and selection of the i-th $TDOA_{11,i}$ and the j-th $TDOA_{22,j}$ is instructed.

Namely, the direct-wave determiner 16 allows the processes at steps ST5 to ST8 to be repeatedly performed until all combinations of the I values $TDOA_{11,i}$ (i=1, . . . , I) and the J values $TDOA_{22,j}$ (j=1, . . . , J) which are calculated by the autocorrelation processor 4 are selected and results of comparisons made by the comparison processor 15 are obtained (step ST9).

The direct-wave determiner 16 determines that the value $TDOA_{12,k}$ selected by the TDOA selector 11 is a time difference of arrival resulting from direct waves emitted from the radio source, when a result of a comparison made by the comparison processor 15 shows that the inner product $C_{k,i,j}$ is smaller than the threshold value $C_{th}$ for all combinations of the values $TDOA_{11,i}$ and $TDOA_{22,j}$ selected by the TDOA selector 12.

When the direct-wave determiner 16 determines whether the value $TDOA_{12,k}$ selected by the TDOA selector 11 is a time difference of arrival resulting from direct waves emitted from the radio source, if the value of the variable k has not reached K yet (step ST10), the direct-wave determiner 16 increments the variable k by one and then outputs the variable k to the TDOA selector 11 and instructs to reselect the k-th $TDOA_{12,k}$.

By this, the TDOA selector 11 selects the k-th $TDOA_{12,k}$ that has not yet been selected, from among the K values $TDOA_{12,k}$ (k=1, . . . , K) calculated by the cross-correlation processor 3, by which the processes at steps ST4 to ST8 are repeated.

By the above, it is determined whether the K values $TDOA_{12,k}$ (k=1, . . . , K) calculated by the cross-correlation processor 3 are time differences of arrival resulting from direct waves emitted from the radio source.

The positioning processor 6 calculates the location of the radio source, using the values $TDOA_{12,k}$ that are determined by the determination processor 5 to be time differences of arrival resulting from direct waves and selected from among the values $TDOA_{12,k}$ calculated by the cross-correlation processor 3. A radio-source positioning process itself is a publicly known technique and thus a detailed description thereof is omitted.

Although in FIGS. 3, 4, and 5 the number of radio sources is one for simplification of description, when the number of radio sources is two or more, the number of peaks in a cross-correlation and the number of peaks in autocorrelations just increase, and accordingly, the number of the values $TDOA_{12,k}$ calculated by the cross-correlation processor 3 and the numbers of the values $TDOA_{11,i}$ and $TDOA_{22,j}$ calculated by the autocorrelation processor 4 just increase.

Therefore, as with the case in which the number of radio sources is one, by examining all combinations of the values $TDOA_{11,i}$ and $TDOA_{22,j}$ calculated by the autocorrelation processor 4, it can be determined whether each of the values $TDOA_{12,k}$ calculated by the cross-correlation processor 3 is a time difference of arrival resulting from direct waves.

To clarify an effect of the positioning device according to the first embodiment, a computer simulation is exemplified below.

Figure 6:
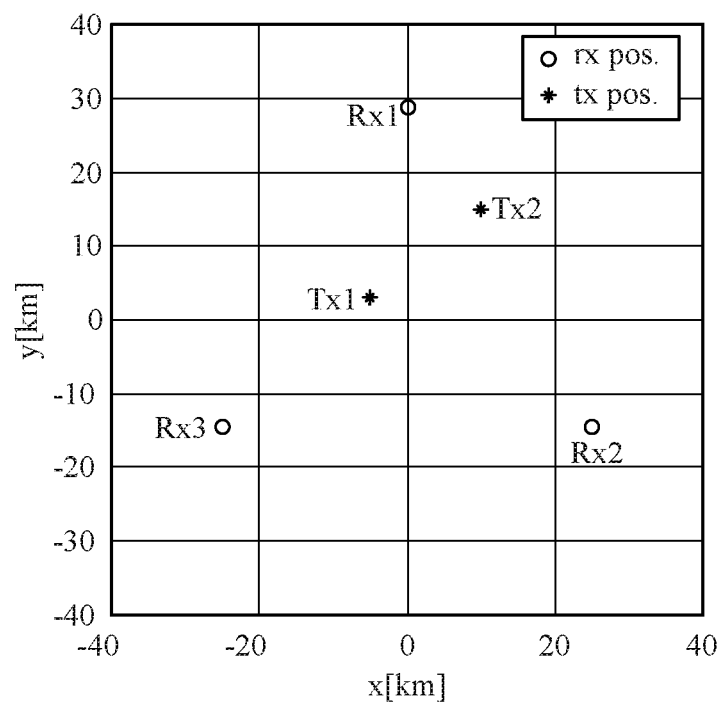
FIG. 6 is an illustrative diagram showing disposition of radio sources and antennas used when a computer simulation is performed.

FIG. 6 is an illustrative diagram showing disposition of radio sources and antennas used when a computer simulation is performed. In FIG. 6, Tx1 and Tx2 are radio sources and Rx1, Rx2, and Rx3 are antennas.

FIG. 7 is an illustrative diagram showing the values of TDOAs resulting from direct waves.

Here, simulation conditions are as follows: the number of radio sources is two, the number of antennas is three, a direct wave emitted from the radio source Tx1 reaches the antenna Rx2 and a direct wave emitted from the radio source Tx2 reaches the antenna Rx3, and a multipath wave (one wave) of a radio wave emitted from the radio source Tx1 also reaches the antenna Rx2 and a multipath wave (one wave) of a radio wave emitted from the radio source Tx2 also reaches the antenna Rx3.

At this time, three peak values are obtained for cross-correlation $CCF(x_1(t), x_2(t))$, four peak values are obtained for cross-correlation $CCF(x_2(t), x_3(t))$, and three peak values are obtained for cross-correlation $CCF(x_3(t), x_1(t))$.

The positioning device according to the first embodiment performs a process of selecting two TDOAs resulting from direct waves from each set of TDOAs having the above-described peak values.

FIG. 8 is an illustrative diagram showing TDOAs obtained by cross-correlation computation and TDOAs resulting from direct waves that are selected in the present invention.

Figure 9:
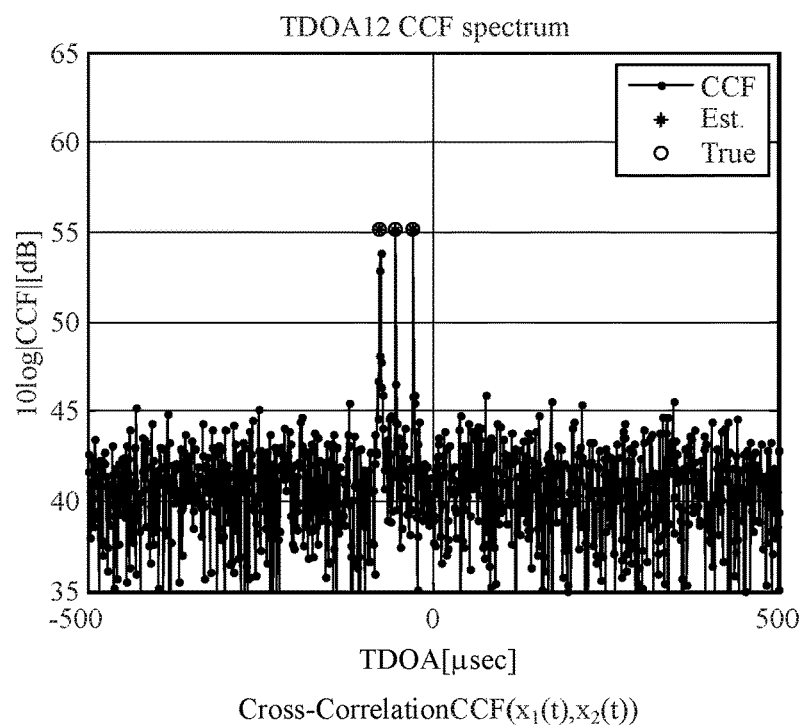
FIG. 9 is an illustrative diagram showing cross-correlation $CCF(x_1(t), x_2(t))$.
Figure 10:
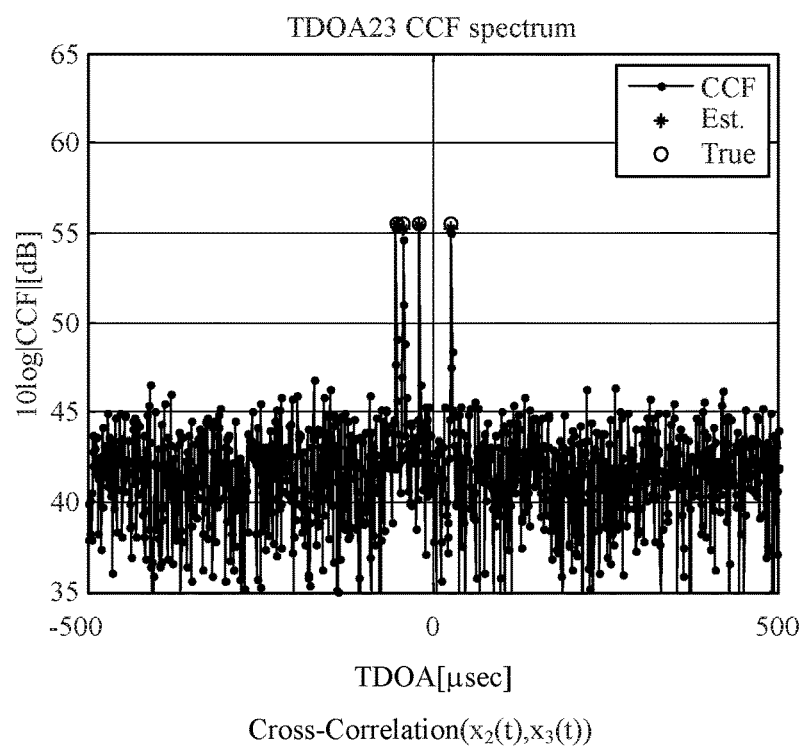
FIG. 10 is an illustrative diagram showing cross-correlation $CCF(x_2(t), x_3(t))$.
Figure 11:
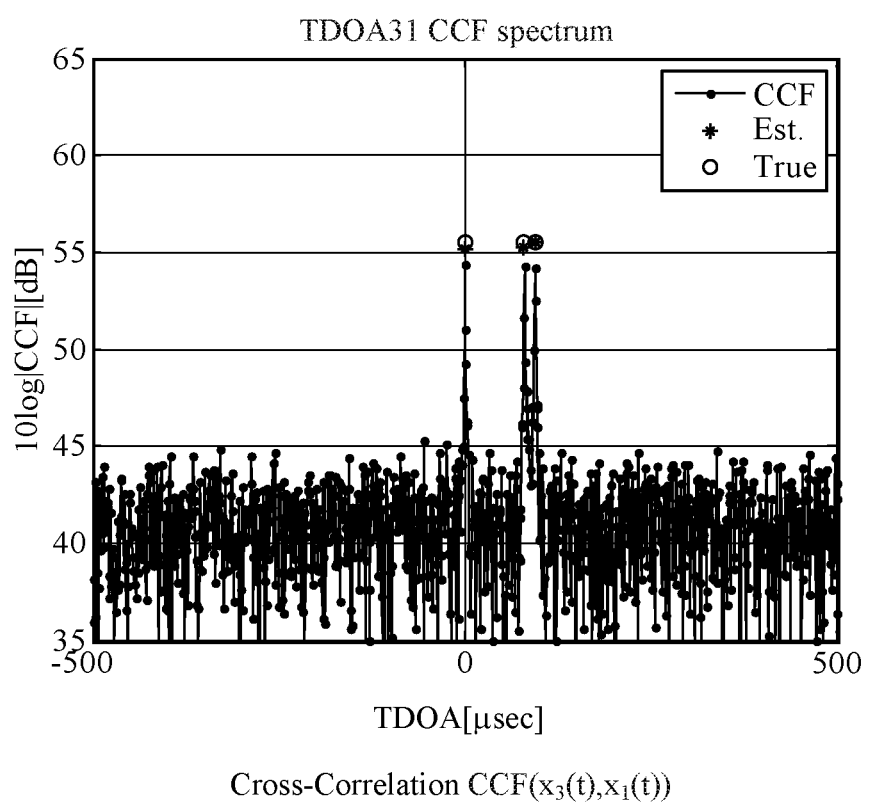
FIG. 11 is an illustrative diagram showing cross-correlation $CCF(x_3(t), x_1(t))$.

FIG. 9 is an illustrative diagram showing cross-correlation $CCF(x_1(t), x_2(t))$ and FIG. 10 is an illustrative diagram showing cross-correlation $CCF(x_2(t), x_3(t))$. In addition, FIG. 11 is an illustrative diagram showing cross-correlation $CCF(x_3(t), x_1(t))$.

Comparing FIGS. 7 and 8, it can be confirmed that only correct TDOAs are selected by the present invention. As such, only TDOAs resulting from direct waves can be selected by the present invention.

As is clear from the above, according to the first embodiment, it is configured such that the determination processor 5 is provided that determines, using the values $TDOA_{11,i}$ and $TDOA_{22,j}$ calculated by the autocorrelation processor 4, whether the values $TDOA_{12,k}$ calculated by the cross-correlation processor 3 are time differences of arrival resulting from direct waves emitted from a radio source, and the positioning processor 6 calculates the location of the radio source, using the values $TDOA_{12,k}$ that are determined by the determination processor 5 to be time differences of arrival resulting from direct waves and selected from among the values $TDOA_{12,k}$ calculated by the cross-correlation processor 3. Thus, an effect is provided that allows to calculate, even under an environment where there is two or more unknown radio sources, the locations of the radio sources with high accuracy, using TDOAs resulting from direct waves.

Second Embodiment

The above-described first embodiment shows that a time-shifting processor 13 performs the time-shifting process by calculating the shift time $(TDOA_{12,k}-(TDOA_{11,i}-TDOA_{22,j}))$ for the received signal $x_1(t)$ of the antenna 1 using the value $TDOA_{12,k}$ selected by the TDOA selector 11 and the values $TDOA_{11,i}$ and $TDOA_{22,j}$ selected by a TDOA selector 12, and shifting the received signal $x_1(t)$ of the antenna 1 in time by the shift time. Alternatively, the time-shifting processor 13 can calculate a shift time $(TDOA_{12,k}-TDOA_{11,i})$ for a received signal $x_1(t)$ of the antenna 1 and a shift time $(TDOA_{22,j})$ for a received signal $x_2(t)$ of an antenna 2, using the value $TDOA_{12,k}$ selected by the TDOA selector 11 and the values $TDOA_{11,i}$ and $TDOA_{22,j}$ selected by the TDOA selector 12, further can shift the received signal $x_1(t)$ of the antenna 1 forward in time by the shift time $(TDOA_{12,k}-TDOA_{11,i})$ and delay the received signal $x_2(t)$ of the antenna 2 in time by the shift time $(TDOA_{22,j})$.

A specific operation is as follows.

The time-shifting processor 13 performs a time-shifting process by calculating the shift time ($TDOA_{12,k}-TDOA_{11,i}$) for a received signal $x_1(t)$ of the antenna 1 using the value $TDOA_{12,k}$ selected by the TDOA selector 11 and the value $TDOA_{11,i}$ selected by the TDOA selector 12, and shifting the received signal $x_1(t)$ of the antenna 1 forward in time by the shift time ($TDOA_{12,k}-TDOA_{11,i}$), as shown in the following formula (9).

$$x_1(t+TDOA_{12,k}-TDOA_{11,i}) \quad (9)$$

In addition, the time-shifting processor 13 performs a time-shifting process by setting the value $TDOA_{22,j}$ selected by the TDOA selector 12 as a shift time ($TDOA_{22,j}$) for a received signal $x_2(t)$ of the antenna 2, and delaying the received signal $x_2(t)$ of the antenna 2 in time by the shift time ($TDOA_{22,j}$), as shown in the following formula (10).

$$x_2(t-TDOA_{22,j}) \quad (10)$$

When an inner-product calculator 14 receives from the time-shifting processor 13 the received signal $x_1(t+TDOA_{12,k}-TDOA_{11,i})$ having been subjected to the time-shifting process and the received signal $x_2(t-TDOA_{22,j})$ having been subjected to the time-shifting process, as shown in the following equation (11), the inner-product calculator 14 calculates an inner product $C_{k,i,j}$ between the received signal $x_1(t+TDOA_{12,k}-TDOA_{11,i})$ having been subjected to the time-shifting process and the received signal $x_2(t-TDOA_{22,j})$ having been subjected to the time-shifting process.

$$C_{k,i,j}=<x_1(t+TDOA_{12,k}-TDOA_{11,i}),x_2(t-TDOA_{22,j})> \quad (11)$$

The second embodiment differs from the first embodiment in that while in the first embodiment the time-shifting processor 13 shifts only the received signal $x_1(t)$ of the antenna 1 in time, in the second embodiment the time-shifting processor 13 shifts in time not only the received signal $x_1(t)$ of the antenna 1 but also the received signal $x_2(t)$ of the antenna 2. A total amount of time-shift for the two received signals $x_1(t)$ and $x_2(t)$ is equal to ($TDOA_{12,k}-(TDOA_{11,i}-TDOA_{22,j})$) in both embodiments.

Therefore, when the value $TDOA_{12,k}$ selected by the TDOA selector 11 results from a multipath wave, the inner product $C_{k,i,j}$ between the received signal $x_1(t+TDOA_{12,k}-TDOA_{11,i})$ having been subjected to the time-shifting process and the received signal $x_2(t-TDOA_{22,j})$ having been subjected to the time-shifting process has a large value as with the inner product $C_{k,i,j}$ calculated in the first embodiment.

On the other hand, when the value $TDOA_{12,k}$ selected by the TDOA selector 11 results from direct waves, the inner product $C_{k,i,j}$ between the received signal $x_1(t+TDOA_{12,k}-TDOA_{11,i})$ having been subjected to the time-shifting process and the received signal $x_2(t-TDOA_{22,j})$ having been subjected to the time-shifting process has a small value as with the inner product $C_{k,i,j}$ calculated in the first embodiment.

Processing content of a comparison processor 15 and a direct-wave determiner 16 is the same as that of the first embodiment and thus description thereof is omitted.

By the above, even if the time-shifting processor 13 shifts two received signals $x_1(t)$ and $x_2(t)$ in time such that a total amount of time-shift for the received signal $x_1(t)$ of the antenna 1 and the received signal $x_2(t)$ of the antenna 2 is equal to the value $TDOA_{12,DIRECT}$ resulting from direct waves, as in the above-described first embodiment, the effect is provided that allows to calculate, even under an environment where there is two or more unknown radio sources, the locations of the radio sources with high accuracy, using TDOAs resulting from direct waves.

Third Embodiment

The above-described first embodiment shows that there are provided a time-shifting processor 13 that shifts the received signal $x_1(t)$ of the antenna 1 forward in time by the shift time ($TDOA_{12,k}-(TDOA_{11,i}-TDOA_{22,j})$) and the inner-product calculator 14 that calculates the inner product $C_{k,i,j}$ between the received signal $x_1(t+TDOA_{12,k}-(TDOA_{11,i}-TDOA_{22,j}))$ having been subjected to the time-shifting process and a received signal $x_2(t)$ of an antenna 2, and it is determined that the value $TDOA_{12,k}$ selected by a TDOA selector 11 is a time difference of arrival resulting from direct waves, when the inner product $C_{k,i,j}$ calculated by the inner-product calculator 14 is smaller than a threshold value $C_{th}$. Alternatively, it may be determined that the value $TDOA_{12,k}$ selected by the TDOA selector 11 is a time difference of arrival resulting from direct waves, when there is no peak at the position of time of ($TDOA_{12,k}-(TDOA_{11,i}-TDOA_{22,j})$) in the cross-correlation CCF($x_1(t)$, $x_2(t)$) calculated by a cross-correlation processor 3.

Figure 12:
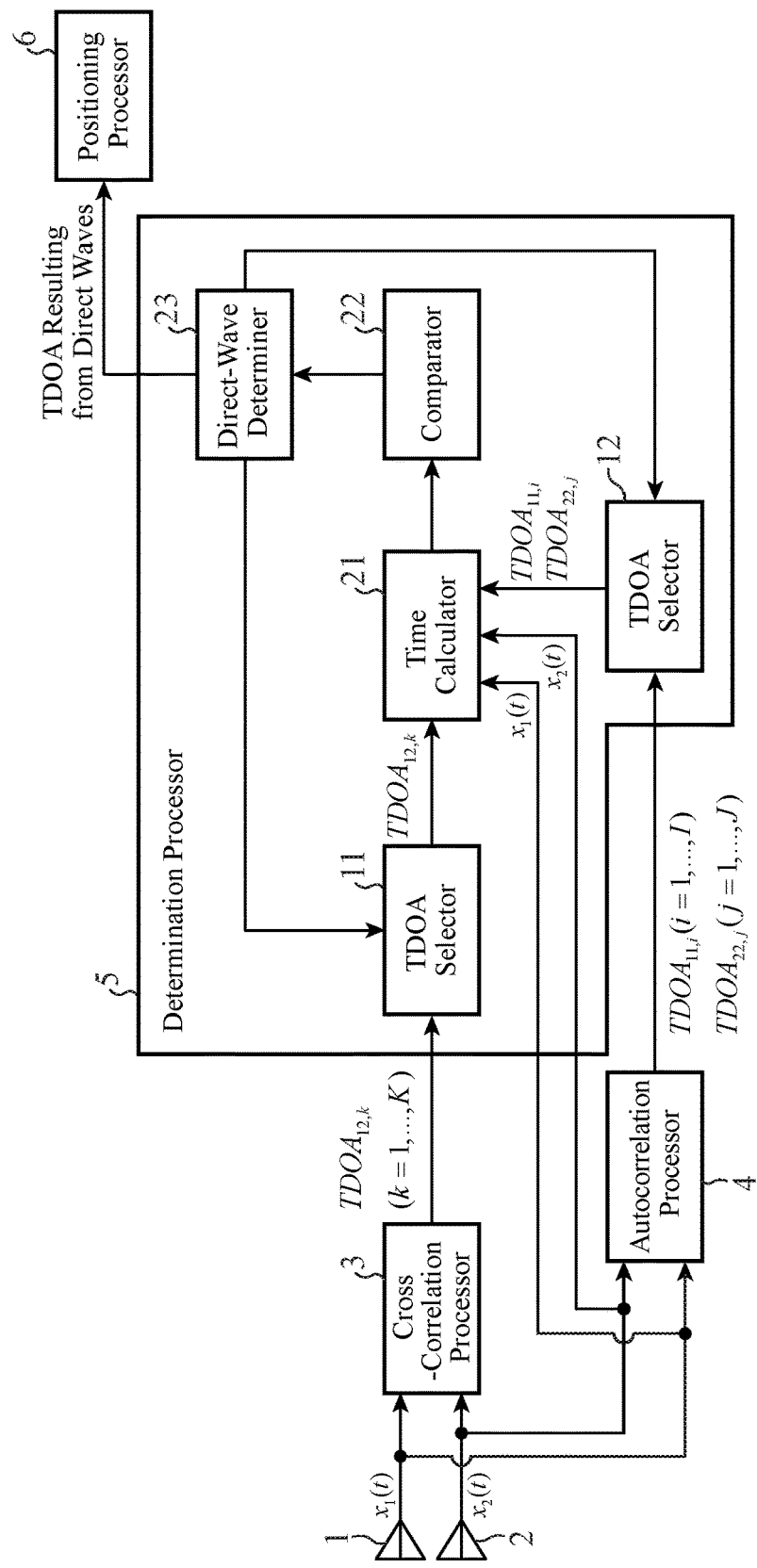
FIG. 12 is a configuration diagram showing a positioning device according to a third embodiment of the invention.

FIG. 12 is a configuration diagram showing a positioning device according to a third embodiment of the invention, and in the drawing the same reference signs as those in FIG. 1 indicate the same or corresponding portions and thus description thereof is omitted.

A time calculator 21 performs a process of calculating the amount of time ($TDOA_{12,k}-(TDOA_{11,i}-TDOA_{22,j})$), using the value $TDOA_{12,k}$ selected by a TDOA selector 11 and the values $TDOA_{11,i}$ and $TDOA_{22,j}$ selected by a TDOA selector 12.

A comparison processor 22 performs a process of obtaining a cross-correlation value $P_{k,i,j}$ at the position represented by the time ($TDOA_{12,k}-(TDOA_{11,i}-TDOA_{22,j})$) calculated by the time calculator 21, from the cross-correlation CCF ($x_1(t)$, $x_2(t)$) that is calculated by a cross-correlation processor 3, and comparing the cross-correlation value $P_{k,i,j}$ with a preset threshold value $P_{th}$.

A direct-wave determiner 23 determines that the value $TDOA_{12,k}$ selected by the TDOA selector 11 is a time difference of arrival resulting from direct waves emitted from a radio source, when a result of a comparison made by the comparison processor 22 shows that the cross-correlation value $P_{k,i,j}$ is smaller than the threshold value $P_{th}$ for all combinations of the values $TDOA_{11,i}$ and $TDOA_{22,j}$ selected by the TDOA selector 12.

Note that the comparison processor 22 and the direct-wave determiner 23 compose a determining unit.

Figure 13:
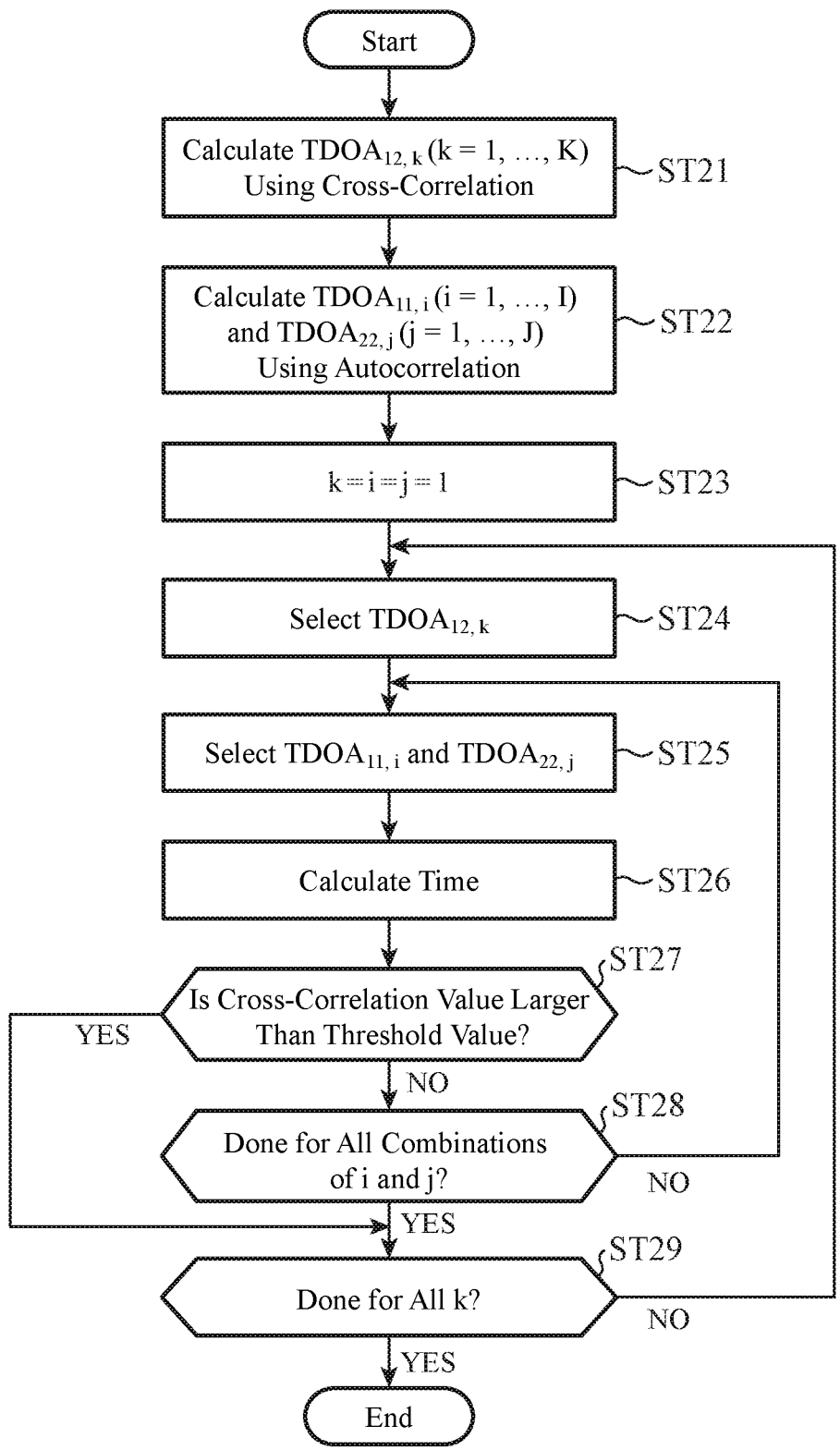
FIG. 13 is a flowchart showing processing content of the positioning device according to the third embodiment of the invention.

FIG. 13 is a flowchart showing processing content of the positioning device according to the third embodiment of the invention.

Next, an operation will be described.

When the cross-correlation processor 3 receives a received signal $x_1(t)$ of an antenna 1 and a received signal $x_2(t)$ of an antenna 2, as with the above-described first embodiment, the cross-correlation processor 3 calculates cross-correlation CCF ($x_1(t)$, $x_2(t)$) between the received signal $x_1(t)$ and the received signal $x_2(t)$.

When the cross-correlation processor 3 calculates the cross-correlation CCF($x_1(t)$, $x_2(t)$), the cross-correlation processor 3 searches for peak values of the cross-correlation CCF($x_1(t)$, $x_2(t)$) and outputs times corresponding to the peak values to a determination processor 5, as time differences of arrival ($TDOA_{12,k}$ (k=1, . . . , K)) between signal waves (a direct wave and a multipath wave) contained in the received signal $x_1(t)$ and signal waves (a direct wave and a multipath wave) contained in the received signal $x_2(t)$ (step ST21).

Figure 14:
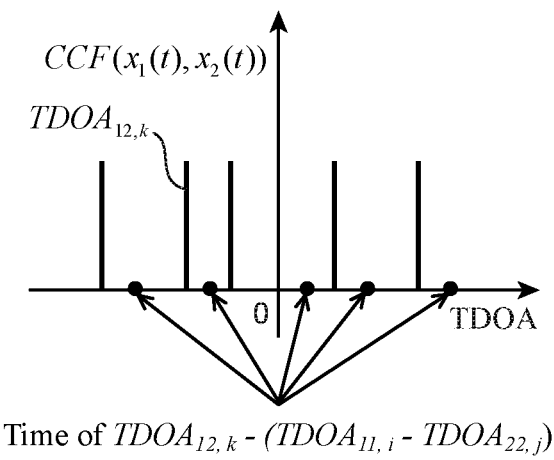
FIG. 14 is an illustrative diagram showing an example of cross-correlation $CCF(x_1(t), x_2(t))$ calculated by a cross-correlation processor 3.

Here, FIG. 14 is an illustrative diagram showing an example of the cross-correlation $CCF(x_1(t), x_2(t))$ calculated by the cross-correlation processor 3.

When an autocorrelation processor 4 receives the received signal $x_1(t)$ of the antenna 1 and the received signal $x_2(t)$ of the antenna 2, as with the above-described first embodiment, the autocorrelation processor 4 calculates autocorrelation $ACF(x_1(t), x_1(t))$ of the received signal $x_1(t)$ of the antenna 1, and calculates autocorrelation $ACF(x_2(t), x_2(t))$ of the received signal $x_2(t)$ of the antenna 2.

When the autocorrelation processor 4 calculates the autocorrelation $ACF(x_1(t), x_1(t))$ of the received signal $x_1(t)$ of the antenna 1, the autocorrelation processor 4 searches for peak values of the autocorrelation ACF $(x_1(t), x_1(t))$ and outputs times corresponding to the peak values to the determination processor 5, as time differences of arrival $(TDOA_{11,i} (i=1, \ldots, I))$ between signal waves (a direct wave and a multipath wave) contained in the received signal $x_1(t)$ (step ST22).

In addition, the autocorrelation processor 4 searches for peak values of the autocorrelation $ACF(x_2(t), x_2(t))$ of the received signal $x_2(t)$ of the antenna 2 and outputs times corresponding to the peak values to the determination processor 5, as time differences of arrival $(TDOA_{22,j} (j=1, \ldots, J))$ between signal waves (a direct wave and a multipath wave) contained in the received signal $x_2(t)$ (step ST22).

When the cross-correlation processor 3 calculates K number of values $TDOA_{12,k}$ (k=1, ..., K) and the autocorrelation processor 4 calculates I number of values $TDOA_{11,i}$ (i=1, ..., I) and J number of values $TDOA_{22,j}$ (j=1, ..., J), the direct-wave determiner 23 in the determination processor 5 initializes variables k, i, and j to 1 (step ST23).

The TDOA selector 11 selects the k-th $TDOA_{12,k}$ that has not yet been selected, from among the K values $TDOA_{12,k}$ (k=1, ..., K) calculated by the cross-correlation processor 3 (step ST24). At this stage, k=1 and thus the value $TDOA_{12,1}$ is selected.

The TDOA selector 12 selects the i-th $TDOA_{11,i}$ that has not yet been selected, from among the I values $TDOA_{11,i}$ (i=1, ..., I) calculated by the autocorrelation processor 4 (step ST25). At this stage, i=1 and thus the value $TDOA_{11,i}$ is selected.

In addition, the TDOA selector 12 selects the j-th $TDOA_{22,j}$ that has not yet been selected, from among the J values $TDOA_{22,j}$ (j=1, ..., J) calculated by the autocorrelation processor 4 (step ST25). At this stage, j=1 and thus the value $TDOA_{22,1}$ is selected.

When the TDOA selector 11 selects the value $TDOA_{12,k}$ and the TDOA selector 12 selects the values $TDOA_{11,i}$ and $TDOA_{22,j}$, the time calculator 21 calculates the time $(TDOA_{12,k}-(TDOA_{11,i}-TDOA_{22,j}))$, using the values $TDOA_{12,k}$, $TDOA_{11,i}$ and $TDOA_{22,j}$ (step ST26).

When the time calculator 21 calculates the time $(TDOA_{12,k}-(TDOA_{11,i}-TDOA_{22,j}))$, the comparison processor 22 obtains a cross-correlation value $P_{k,i,j}$ at the position represented by the time $(TDOA_{12,k}-(TDOA_{11,i}-TDOA_{22,j}))$ from the cross-correlation $CCF(x_1(t), x_2(t))$ calculated by the cross-correlation processor 3, compares the cross-correlation value $P_{k,i,j}$ with a preset threshold value $P_{th}$, and outputs a result of the comparison to the direct-wave determiner 23 (step ST27).

Although here the comparison processor 22 compares the cross-correlation value $P_{k,i,j}$ with the threshold value $P_{th}$, since the cross-correlation value $P_{k,i,j}$ has the same value as an inner product $C_{k,i,j}$ of equation (8) which is calculated by an inner-product calculator 14 of the above-described first embodiment, comparing the cross-correlation value $P_{k,i,j}$ with the threshold value $P_{th}$ is equivalent to comparing the inner product $C_{k,i,j}$ with a threshold value $C_{th}$.

When the result of the comparison outputted from the comparison processor 22 shows that the cross-correlation value $P_{k,i,j}$ is larger than the threshold value $P_{th}$, the direct-wave determiner 23 determines that the value $TDOA_{12,k}$ selected by the TDOA selector 11 is a time difference of arrival resulting from a multipath wave.

When the direct-wave determiner 23 determines that the value $TDOA_{12,k}$ selected by the TDOA selector 11 is a time difference of arrival resulting from a multipath wave, if the value of the variable k has not reached K yet (step ST29), the direct-wave determiner 23 increments the variable k by one and then outputs the variable k to the TDOA selector 11 and instructs to reselect the k-th $TDOA_{12,k}$.

By this, the TDOA selector 11 selects the k-th $TDOA_{12,k}$ that has not yet been selected, from among the K values $TDOA_{12,k}$ (k=1, ..., K) calculated by the cross-correlation processor 3, by which the processes at steps ST24 to ST27 are repeated.

When the result of the comparison outputted from the comparison processor 22 shows that the cross-correlation value $P_{k,i,j}$ is smaller than the threshold value $P_{th}$, there is the possibility that the value $TDOA_{12,k}$ selected by the TDOA selector 11 is a time difference of arrival resulting from direct waves emitted from a radio source. Thus, if the value of the variable j has not reached J yet, the direct-wave determiner 23 increments the variable j by one and then outputs the variable i and the variable j to the TDOA selector 12 and instructs to reselect the i-th $TDOA_{11,i}$ and the j-th $TDOA_{22,j}$.

On the other hand, if the value of the variable j has already reached J, the variable j is initialized to 1 and the variable i is incremented by one and then the variable i and the variable j are outputted to the TDOA selector 12 and selection of the i-th $TDOA_{11,i}$ and the j-th $TDOA_{22,j}$ is instructed.

Namely, the direct-wave determiner 23 allows the processes at steps ST25 to ST27 to be repeatedly performed until all combinations of the I values $TDOA_{11,i}$ (i=1, ..., I) and the J values $TDOA_{22,j}$ (j=1, ..., J) which are calculated by the autocorrelation processor 4 are selected and results of comparisons made by the comparison processor 22 are obtained (step ST28).

The direct-wave determiner 23 determines that the value $TDOA_{12,k}$ selected by the TDOA selector 11 is a time difference of arrival resulting from direct waves emitted from the radio source, when a result of a comparison made by the comparison processor 22 shows that the cross-correlation value $P_{k,i,j}$ is smaller than the threshold value $P_{th}$ for all combinations of the values $TDOA_{11,i}$ and $TDOA_{22,j}$ selected by the TDOA selector 12.

When the direct-wave determiner 23 determines whether the value $TDOA_{12,k}$ selected by the TDOA selector 11 is a time difference of arrival resulting from direct waves emitted from the radio source, if the value of the variable k has not reached K yet (step ST29), the direct-wave determiner 23 increments the variable k by one and then outputs the variable k to the TDOA selector 11 and instructs to reselect the k-th $TDOA_{12,k}$.

By this, the TDOA selector 11 selects the k-th $TDOA_{12,k}$ that has not yet been selected, from among the K values TDOA$_{12,k}$ (k=1, ..., K) calculated by the cross-correlation processor 3, by which the processes at steps ST24 to ST27 are repeated.

By the above, it is determined whether the K values TDOA$_{12,k}$ (k=1, ..., K) calculated by the cross-correlation processor 3 are time differences of arrival resulting from direct waves emitted from the radio source.

The positioning processor 6 calculates the location of the radio source, using the values TDOA$_{12,k}$ that are determined by the determination processor 5 to be time differences of arrival resulting from direct waves and selected from among the values TDOA$_{12,k}$ calculated by the cross-correlation processor 3.

As is clear from the above, even if it is configured such that the value TDOA$_{12,k}$ selected by the TDOA selector 11 is determined to be a time difference of arrival resulting from direct waves, when there is no peak at the position of time of (TDOA$_{12,k}$−(TDOA$_{11,i}$−TDOA$_{22,j}$)) in the cross-correlation CCF(x$_1$(t), x$_2$(t)) calculated by the cross-correlation processor 3, as with the above-described first embodiment, an effect is provided that allows to calculate, under an environment where there are two or more unknown radio sources, the locations of the radio sources with high accuracy, using TDOAs resulting from direct waves. In addition, an effect is provided that allows to reduce computation load over that of the first embodiment.

Fourth Embodiment

The above-described third embodiment shows that the time calculator 21 calculates the time (TDOA$_{12,k}$−(TDOA$_{11,i}$−TDOA$_{22,j}$)) and it is determined that the value TDOA$_{12,k}$ selected by a TDOA selector 11 is a time difference of arrival resulting from direct waves, when there is no peak at the position represented by the time (TDOA$_{12,k}$−(TDOA$_{11,i}$−TDOA$_{22,j}$)) calculated by the time calculator 21 in the cross-correlation CCF (x$_1$(t), x$_2$(t)) calculated by a cross-correlation processor 3. Alternatively, the time calculator 21 may calculate the time (TDOA$_{22,j}$−TDOA$_{11,i}$) and it may be determined that the value TDOA$_{12,k}$ selected by the TDOA selector 11 is a time difference of arrival resulting from direct waves, when there is no peak at the position of the time (TDOA$_{22,j}$−TDOA$_{11,i}$) calculated by the time calculator 21 in the cross-correlation CCF (x$_1$(t+TDOA$_{12,k}$), x$_2$(t)) between a received signal x$_2$(t) of an antenna 2 and a received signal x$_1$(t+TDOA$_{12,k}$) of an antenna 1 that is shifted upward in time by the value TDOA$_{12,k}$ selected by the TDOA selector 11.

A specific operation is as follows.

When a TDOA selector 12 selects the values TDOA$_{11,i}$ and TDOA$_{22,j}$, the time calculator 21 calculates the time (TDOA$_{22,j}$−TDOA$_{11,i}$) using the values TDOA$_{11,i}$ and TDOA$_{22,j}$.

When the time calculator 21 calculates the time (TDOA$_{22,j}$−TDOA$_{11,i}$), a comparison processor 22 performs a time-shifting process by shifting the a received signal x$_1$(t) of the antenna 1 forward in time by the value TDOA$_{12,k}$ selected by the TDOA selector 11, and calculates a cross-correlation CCF(x$_1$(t+TDOA$_{12,k}$), x$_2$(t)) between a received signal x$_2$(t) of the antenna 2 and the received signal x$_1$ (t+TDOA$_{12,k}$) of the antenna 1 having been subjected to the time-shifting process.

Figure 15:
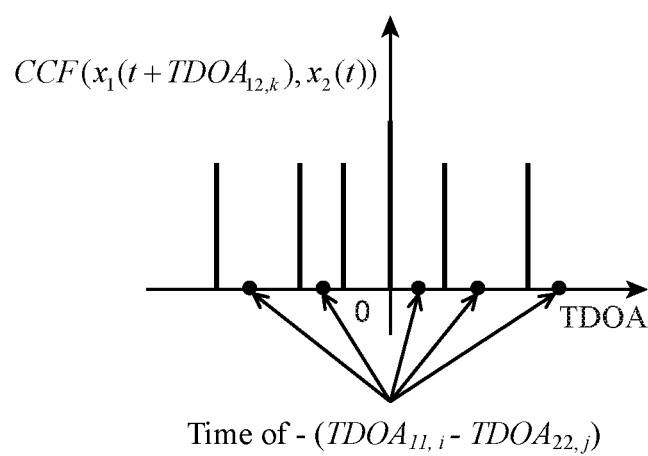
FIG. 15 is an illustrative diagram showing an example of cross-correlation $CCF(x_1(t+TDOA_{12,k}), x_2(t))$ calculated by a comparison processor 22.

FIG. 15 is an illustrative diagram showing an example of the cross-correlation CCF (x$_1$(t+TDOA$_{12,k}$), x$_2$(t)) calculated by the comparison processor 22.

When the comparison processor 22 calculates the cross-correlation CCF(x$_1$(t+TDOA$_{12,k}$), x$_2$(t)), the comparison processor 22 obtains, from the cross-correlation CCF(x$_1$(t+TDOA$_{12,k}$), x$_2$(t)), a cross-correlation value P$_{k,i,j}$ at the position represented by the time (TDOA$_{22,j}$−TDOA$_{11,i}$) calculated by the time calculator 21, compares the cross-correlation value P$_{k,i,j}$ with a preset threshold value P$_{th}$, and outputs a result of the comparison to a direct-wave determiner 23.

Although here the comparison processor 22 compares the cross-correlation value P$_{k,i,j}$ with the threshold value P$_{th}$, since the cross-correlation value P$_{k,i,j}$ has the same value as an inner product C$_{k,i,j}$ of equation (11) which is calculated by an inner-product calculator 14 of the above-described second embodiment, comparing the cross-correlation value P$_{k,i,j}$ with the threshold value P$_{th}$ is equivalent to comparing the inner product C$_{k,i,j}$ with a threshold value C$_{th}$.

Processing content of the direct-wave determiner 23 is the same as that of the above-described third embodiment and thus a detailed description thereof is omitted.

By the above, even if it is determined that the value TDOA$_{12,k}$ selected by the TDOA selector 11 is a time difference of arrival resulting from direct waves, when there is no peak at the position represented by the time (TDOA$_{22,j}$−TDOA$_{11,i}$) calculated by the time calculator 21 in the cross-correlation CCF(x$_1$(t+TDOA$_{12,k}$), x$_2$(t)) between a received signal x$_2$(t) of the antenna 2 and a received signal x$_1$(t+TDOA$_{12,k}$) of the antenna 1 that is shifted upward in time by the value TDOA$_{12,k}$, as with the above-described third embodiment, an effect is provided that allows to calculate, even under an environment where there are two or more unknown radio sources, the locations of the radio sources with high accuracy, using TDOAs resulting from direct waves.

Fifth Embodiment

The above-described first to fourth embodiments show that TDOAs resulting from direct waves are selected from among the K values TDOA$_{12,k}$ (k=1, ..., K) obtained from cross-correlation CCF(x$_1$(t), x$_2$(t)) between a received signal x$_1$(t) of an antenna 1 and a received signal x$_2$(t) of an antenna 2, and the location of a radio source is calculated with high accuracy, using the TDOAs resulting from direct waves. Alternatively, FDOAs resulting from direct waves may be selected from among the Frequency Differences of Arrival FDOA$_{12,k}$ (k=1, ..., K) which are K frequency differences of arrival obtained from a cross-correlation CCF(X$_1$(f), X$_2$(f)) between a signal in frequency domain corresponding to a received signal x$_1$(t) of the antenna 1 and a signal in frequency domain corresponding to a received signal x$_2$(t) of an antenna 2, and the location of a radio source may be calculated with high accuracy, using the FDOAs resulting from direct waves.

Figure 16:
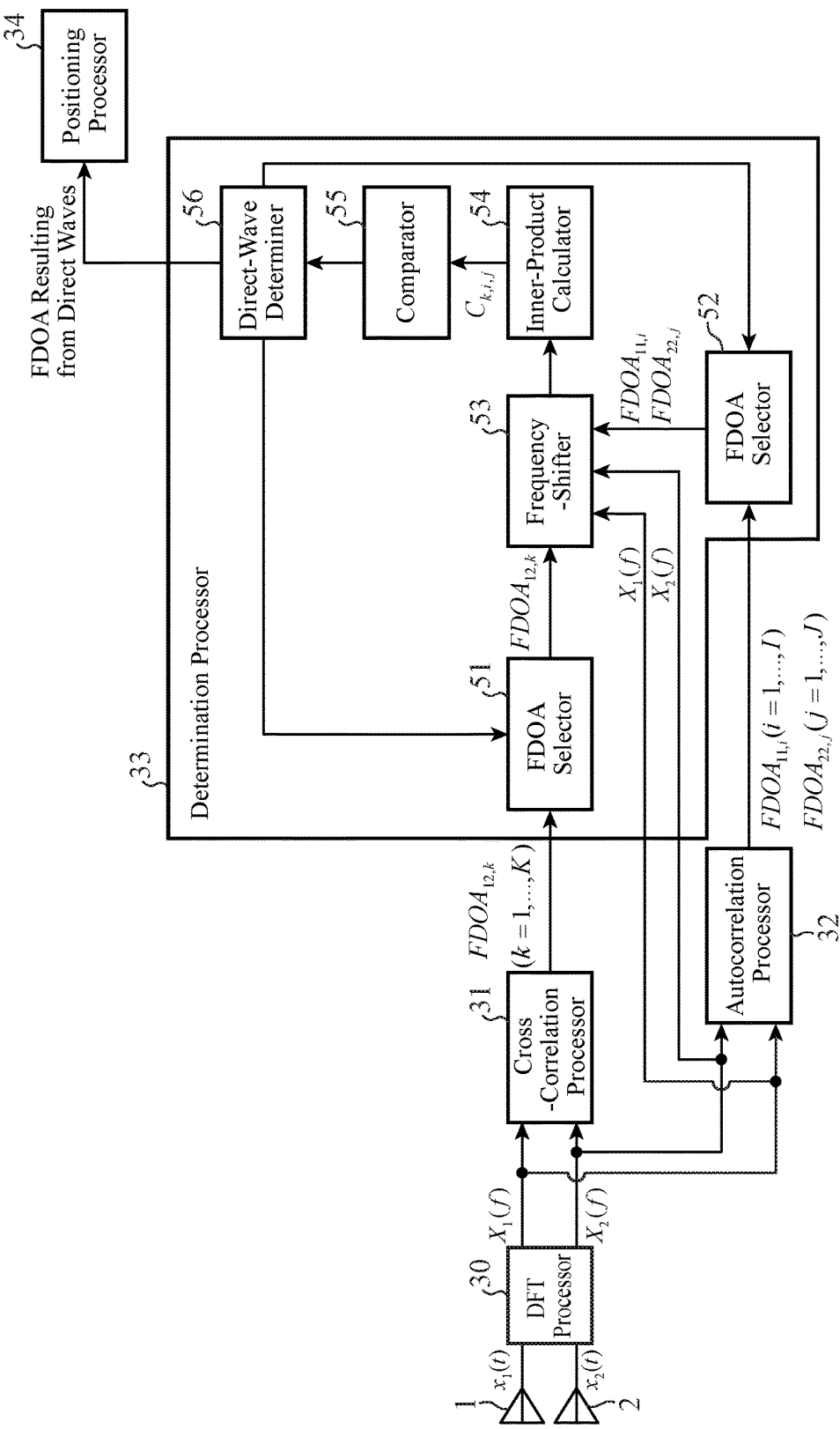
FIG. 16 is a configuration diagram showing a positioning device according to a fifth embodiment of the invention.

FIG. 16 is a configuration diagram showing a positioning device according to a fifth embodiment of the invention, and in the drawing the same reference signs as those in FIG. 1 indicate the same or corresponding portions and thus description thereof is omitted.

A DFT processor 30 performs a discrete Fourier transform (DFT: Discrete Fourier Transform) of received signals x$_1$(t) and x$_2$(t) of antennas 1 and 2, and thereby transforms the received signals x$_1$(t) and x$_2$(t) into received signals X$_1$(f) and X$_2$(f) in frequency domain. Note that the received signals X$_1$(f) and X$_2$(f) in frequency domain are discrete-frequency signals.

A cross-correlation processor 31 performs a process of calculating a cross-correlation CCF(X$_1$(f), X$_2$(f)) between the received signal X$_1$(f) corresponding to the antenna 1 and the received signal $X_2(f)$ corresponding to the antenna 2 which have been transformed into the frequency domain by the DFT processor 30, and calculating, from the cross-correlation CCF($X_1(f)$, $X_2(f)$), the values $FDOA_{12,k}$ (k=1, ..., K) which are frequency differences of arrival between signal waves (a direct wave and a multipath wave) contained in the received signal $X_1(f)$ and signal waves (a direct wave and a multipath wave) contained in the received signal $X_2(f)$. Note that the cross-correlation processor 31 composes a first frequency-difference-of-arrival calculator.

An autocorrelation processor 32 performs a process of calculating the autocorrelation ACF($X_1(f)$, $X_1(f)$) of the received signal $X_1(f)$ of the antenna 1 which has been transformed into the frequency domain by the DFT processor 30, and calculating, from the autocorrelation ACF($X_1(f)$, $X_1(f)$), the values $FDOA_{11,i}$ (i=1, ..., I) which are frequency differences of arrival between a plurality of signal waves (a direct wave and a multipath wave) contained in the received signal $X_1(f)$.

In addition, the autocorrelation processor 4 performs a process of calculating the autocorrelation ACF($X_2(f)$, $X_2(f)$) of the received signal $X_2(f)$ of the antenna 2 which has been transformed into the frequency domain by the DFT processor 30, and calculating, from the autocorrelation ACF($X_2(f)$, $X_2(f)$), the values $FDOA_{22,j}$ (j=1, ..., J) which are the frequency differences of arrival between a plurality of signal waves (a direct wave and a multipath wave) contained in the received signal $X_2(f)$. Note that the autocorrelation processor 4 composes a second frequency-difference-of-arrival calculator.

A determination processor 33 performs a process of determining, using the values $FDOA_{11,i}$ and $FDOA_{22,j}$ calculated by the autocorrelation processor 32, whether the values $FDOA_{12,k}$ calculated by the cross-correlation processor 31 are frequency differences of arrival resulting from direct waves emitted from a radio source. Note that the determination processor 33 composes a determiner.

A positioning processor 34 performs a process of calculating the location of the radio source, using the values $FDOA_{12,k}$ that are determined by the determination processor 33 to be frequency differences of arrival resulting from direct waves and selected from among the values $FDOA_{12,k}$ calculated by the cross-correlation processor 31. In this regard, the positioning processor 34 is configured to have a location calculator.

An FDOA selector 51 performs a process of selecting an arbitrary $FDOA_{12,k}$ that has not yet been selected, from among the K values $FDOA_{12,k}$ (k=1, ..., K) calculated by the cross-correlation processor 31.

An FDOA selector 52 performs a process of selecting an arbitrary $FDOA_{11,i}$ that has not yet been selected, from among the I values $FDOA_{11,i}$ (i=1, ..., I) calculated by the autocorrelation processor 32, and selecting an arbitrary $FDOA_{22,j}$ that has not yet been selected, from among the J values $FDOA_{22,j}$ (j=1, ..., J) calculated by the autocorrelation processor 32.

A frequency-shifting processor 53 performs a frequency-shifting process where the received signal of the antenna 1 which has been transformed into the signal in the frequency domain by the DFT processor 30 is shifted upward in frequency by a frequency that is obtained by subtracting a difference ($FDOA_{11,i}$–$FDOA_{22,j}$) between the values $FDOA_{11,i}$ and $FDOA_{22,j}$ selected by the FDOA selector 52, from the value $FDOA_{12,k}$ selected by the FDOA selector 51, and performs a process of outputting to an inner-product calculator 54 the received signal $X_1(f+FDOA_{12,k}-(FDOA_{11,i}-FDOA_{22,j}))$ having been subjected to the frequency-shifting process and the received signal $X_2(f)$ of the antenna 2 having been transformed into the frequency domain by the DFT processor 30.

Note that the FDOA selectors 51 and 52 and the frequency-shifting processor 53 compose a frequency shifter.

The inner-product calculator 54 performs a process of calculating an inner product $C_{k,i,j}$ between the received signal $X_1(f+FDOA_{12,k}-(FDOA_{11,i}-FDOA_{22,j}))$ having been subjected to the frequency-shifting process and the received signal $X_2(f)$ of the antenna 2 having been transformed into the frequency domain by the DFT processor 30, which are outputted from the frequency-shifting processor 53.

A comparison processor 55 performs a process of comparing the inner product $C_{k,i,j}$ calculated by the inner-product calculator 54 with a preset threshold value $C_{th}$.

A direct-wave determiner 56 determines that the value $FDOA_{12,k}$ selected by the FDOA selector 51 is a frequency difference of arrival resulting from direct waves emitted from the radio source, when a result of a comparison made by the comparison processor 55 shows that the inner product $C_{k,i,j}$ is smaller than the threshold value $C_{th}$ for all combinations of the values $FDOA_{11,i}$ and $FDOA_{22,j}$ selected by the FDOA selector 52.

Note that the comparison processor 55 and the direct-wave determiner 56 compose a determining unit.

Although in the example of FIG. 16 it is assumed that each of the antennas 1 and 2, the DFT processor 30, the cross-correlation processor 31, the autocorrelation processor 32, the determination processor 33, and the positioning processor 34 which are components of the positioning device is composed of dedicated hardware (e.g., components other than the antennas 1 and 2 are a semiconductor integrated circuit or single-chip microcomputer having a CPU mounted thereon), the components other than the antennas 1 and 2 may be composed of a computer.

When the components other than the antennas 1 and 2 are composed of a computer, a program that describes processing content of the DFT processor 30, the cross-correlation processor 31, the autocorrelation processor 32, the determination processor 33, and the positioning processor 34 may be stored in a memory of the computer, and a CPU of the computer may execute the program stored in the memory.

Figure 17:
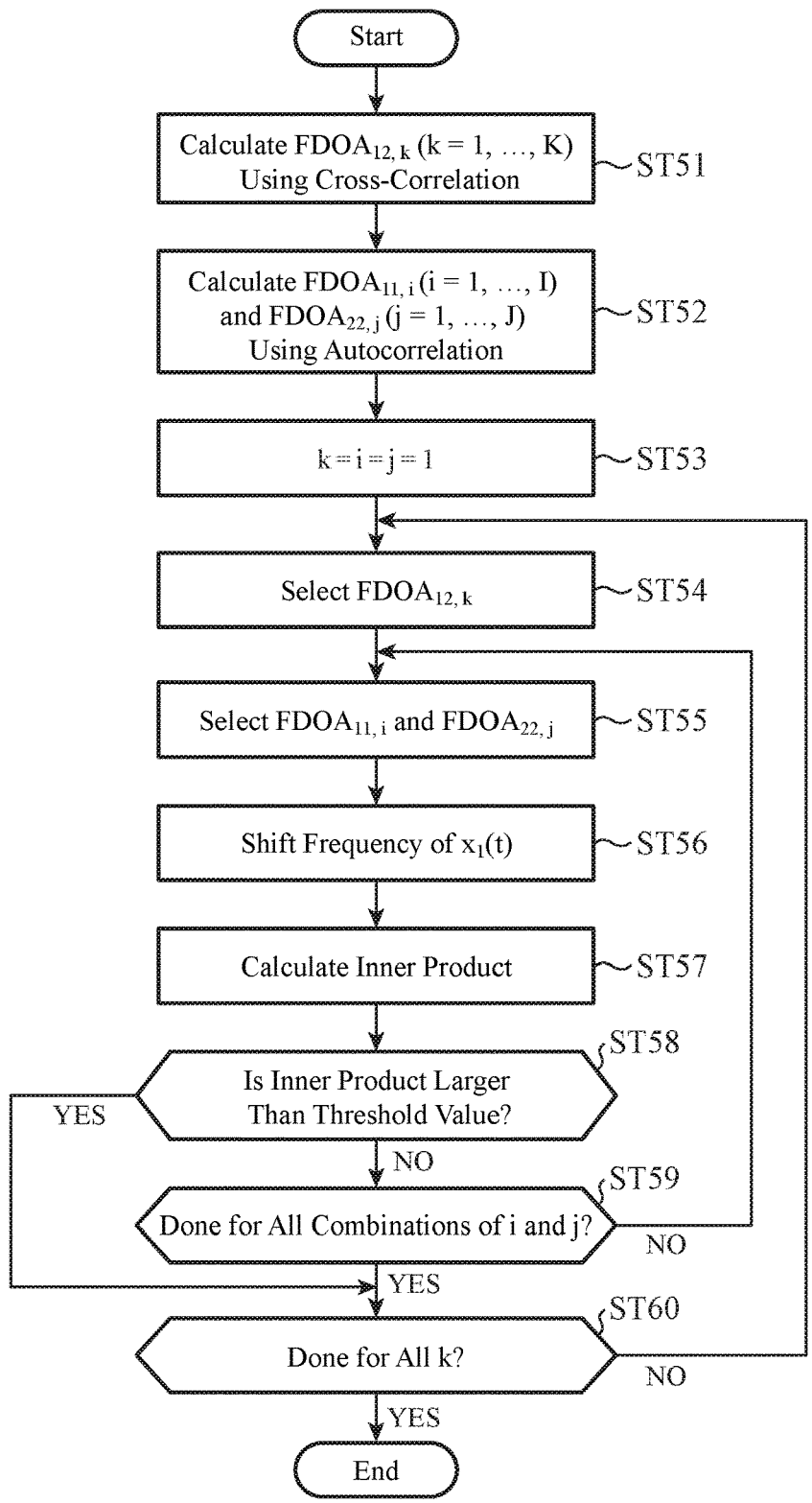
FIG. 17 is a flowchart showing processing content of the positioning device according to the fifth embodiment of the invention.

FIG. 17 is a flowchart showing processing content of the positioning device according to the fifth embodiment of the invention.

Next, an operation will be described.

The antenna 1 which is a receiving sensor receives a signal (e.g., radio waves, acoustic waves, light, and the like) where a direct wave and a multipath wave that are emitted from an unknown radio source interfere with each other, and outputs the received signal $x_1(t)$ to the DFT processor 30.

In addition, the antenna 2 which is a receiving sensor receives a signal (e.g., radio waves, acoustic waves, light, and the like) where a direct wave and a multipath wave that are emitted from the unknown radio source interfere with each other, and outputs the received signal $x_2(t)$ to the DFT processor 30.

The DFT processor 30 performs a discrete Fourier transform of the received signals $x_1(t)$ and $x_2(t)$ of the antennas 1 and 2, and thereby transforms the received signals $x_1(t)$ and $x_2(t)$ into received signals $X_1(f)$ and $X_2(f)$ in frequency domain, and outputs the received signals $X_1(f)$ and $X_2(f)$ to the cross-correlation processor 31 and the autocorrelation processor 32.

When the cross-correlation processor 31 receives from the DFT processor 30 the received signal $X_1(f)$ of the antenna 1 and the received signal $X_2(f)$ of the antenna 2 that have been subjected to the transform into frequency domain, the cross-correlation processor 31 calculates cross-correlation CCF $(X_1(f), X_2(f))$ between the received signal $X_1(f)$ and the received signal $X_2(f)$.

When the cross-correlation processor 31 calculates the cross-correlation $CCF(X_1(f), X_2(f))$, the cross-correlation processor 31 searches for peak values of the cross-correlation $CCF(X_1(f), X_2(f))$ and outputs frequencies corresponding to the peak values to the determination processor 33, as frequency differences of arrival ($FDOA_{12,k}$ (k=1, . . . , K)) between signal waves (a direct wave and a multipath wave) contained in the received signal $X_1(f)$ and signal waves (a direct wave and a multipath wave) contained in the received signal $X_2(f)$ (step ST51).

When the autocorrelation processor 32 receives from the DFT processor 30 the received signal $X_1(f)$ of the antenna 1 and the received signal $X_2(f)$ of the antenna 2 that have been subjected to the transform into frequency domain, the autocorrelation processor 32 calculates autocorrelation $ACF(X_1(f), X_1(f))$ of the received signal $X_1(f)$ of the antenna 1 and calculates the autocorrelation $ACF(X_2(f), X_2(f))$ of the received signal $X_2(f)$ of the antenna 2.

When the autocorrelation processor 32 calculates the autocorrelation $ACF(X_1(f), X_1(f))$ of the received signal $X_1(f)$ of the antenna 1, the autocorrelation processor 32 searches for peak values of the autocorrelation $ACF(X_1(f), X_1(f))$ and outputs frequencies corresponding to the peak values to the determination processor 33, as frequency differences of arrival ($FDOA_{11,i}$ (i=1, . . . , I)) between a plurality of signal waves (a direct wave and a multipath wave) contained in the received signal $X_1(f)$ (step ST52).

In addition, the autocorrelation processor 32 searches for peak values of the autocorrelation $ACF(X_2(f), X_2(f))$ of the received signal $X_2(f)$ of the antenna 2 and outputs frequencies corresponding to the peak values to the determination processor 33, as frequency differences (the values $FDOA_{22,j}$ (j=1, . . . , J)) between a plurality of signal waves (a direct wave and a multipath wave) contained in the received signal $X_2(f)$ (step ST52).

In the fifth embodiment, an environment where there are multipath waves is assumed. Hence, at least one of i and j is 2 or more, and it is assumed that the autocorrelation processor 32 obtains the values $FDOA_{11,i}$ (i=2, . . . , I) and $FDOA_{22,j}$ (j=2, . . . , J) including the values of frequencies of arrival of multipath waves, in addition to the values $FDOA_{11,1}$ and $FDOA_{22,1}$.

A relationship between an autocorrelation and a cross-correlation is as follows:

(1) FDOA resulting from direct waves: $FDOA_{12,DIRECT}$
(2) FDOA resulting from a multipath wave: $FDOA_{12,MULTI}$
(3) Frequency of arrival of a signal at the antenna 1: $FOA_{1,a}$ (a=1, . . . , A), where the frequency of arrival resulting from a direct wave is $FOA_{1,1}$.
(4) Frequency of arrival of a signal at the antenna 2: $FOA_{2,b}$ (b=1, B), where the frequency of arrival resulting from a direct wave is $FOA_{2,1}$.

At this time, for the value $FDOA_{12,MULTI}$ resulting from a multipath wave, there are the values $FDOA_{11,i}$ and $FDOA_{22,j}$ that satisfy the following equations (note that at least one of i and j is 2 or more):

$$FOA_{1,a}=FDOA_{11,i}+FOA_{1,1} \quad (12)$$

$$FOA_{2,b}=FDOA_{22,j}+FOA_{2,1} \quad (13)$$

$$FDOA_{12,DIRECT}=FOA_{1,1}-FOA_{2,1} \quad (14)$$

$$FDOA_{12,MULTI}=FOA_{1,a}-FOA_{2,b} \quad (15)$$

The following equation (16) is derived from equation (12) and equation (13) and the following equation (17) is derived from equation (14) and equation (15), and thus, the following equation (18) holds true:

$$FDOA_{11,i}-FDOA_{22,j}=(FOA_{1,a}-FOA_{1,1})-(FOA_{2,b}-FOA_{2,1}) \quad (16)$$

$$FDOA_{12,MULTI}-FDOA_{12,DIRECT}=(FOA_{1,a}-FOA_{1,1})-(FOA_{2,b}-FOA_{2,1}) \quad (17)$$

$$FDOA_{12,MULTI}-FDOA_{12,DIRECT}=FDOA_{11,i}-FDOA_{22,j} \quad (18)$$

When the cross-correlation processor 31 calculates K number of values $FDOA_{12,k}$ (k=1, . . . , K) and the autocorrelation processor 32 calculates I number of values $FDOA_{11,i}$ (i=1, . . . , I) and J number of values $FDOA_{22,j}$ (j=1, . . . , J), the direct-wave determiner 56 in the determination processor 33 initializes variables k, i, and j to 1 (step ST53).

The FDOA selector 51 selects the k-th $FDOA_{12,k}$ that has not yet been selected, from among the K values $FDOA_{12,k}$ (k=1, . . . , K) calculated by the cross-correlation processor 31 (step ST54). At this stage, k=1 and thus the value $FDOA_{12,1}$ is selected.

The FDOA selector 52 selects the i-th $FDOA_{11,i}$ that has not yet been selected, from among the I values $FDOA_{11,i}$ (i=1, . . . , I) calculated by the autocorrelation processor 32 (step ST55). At this stage, i=1 and thus the value $FDOA_{11,i}$ is selected.

In addition, the FDOA selector 52 selects the j-th $FDOA_{22,j}$ that has not yet been selected, from among the J values $FDOA_{22,j}$ (j=1, . . . , J) calculated by the autocorrelation processor 32 (step ST55). At this stage, j=1 and thus the value $FDOA_{22,1}$ is selected.

Here, considering a case in which the received signal $X_1(f)$ of the antenna 1 is shifted in frequency as shown in the following formula (19), if it is assumed that the value $FDOA_{12,k}$ selected by the FDOA selector 51 results from a multipath wave and the values $FDOA_{11,i}$ and $FDOA_{22,j}$ selected by the FDOA selector 52 each correspond to an amount of frequency deviation from the frequency of arrival of a direct wave, then from the above-described equation (18) the shift frequency $(FDOA_{12,k}-(FDOA_{11,i}-FDOA_{22,j}))$ for the received signal $X_1(f)$ of the antenna 1 matches the value $FDOA_{12,DIRECT}$ resulting from direct waves to the antennas 1 and 2, as shown in the following equation (20):

$$X_1(f+FDOA_{12,k}-(FDOA_{11,i}-FDOA_{22,j})) \quad (19)$$

$$X_1(f+FDOA_{12,k}-(FDOA_{11,i}-FDOA_{22,j}))=X_1(f+FDOA_{12,MULTI}-(FDOA_{12,MULTI}-FDOA_{12,DIRECT}))=X_1(f+FDOA_{12,DIRECT}) \quad (20)$$

Therefore, the shift of the received signal $X_1(f)$ of the antenna 1 in frequency as shown in equation (19) is equivalent to the shift of the received signal $X_1(f)$ of the antenna 1 in frequency by the value $FDOA_{12,DIRECT}$ resulting from direct waves.

When the FDOA selector 51 selects the value $FDOA_{12,k}$ and the FDOA selector 52 selects the values $FDOA_{11,i}$ and $FDOA_{22,j}$, the frequency-shifting processor 53 calculates a shift frequency $(FDOA_{12,k}-(FDOA_{11,i}-FDOA_{22,j}))$ for the received signal $X_1(f)$ of the antenna 1, using the values $FDOA_{12,k}$, $FDOA_{11,i}$ and $FDOA_{22,j}$.

When the frequency-shifting processor 53 calculates the shift frequency $(FDOA_{12,k}-(FDOA_{11,i}-FDOA_{22,j}))$ the frequency-shifting processor 53 performs a frequency-shifting process by shifting the received signal $X_1(f)$ of the antenna 1 upward in frequency by the shift frequency, and outputs the received signal $X_1(f+FDOA_{12,k}-(FDOA_{11,i}-FDOA_{22,j}))$ having been subjected to the frequency-shifting process and the received signal $X_2(f)$ of the antenna 2 to the inner-product calculator 54 (step ST56).

When the inner-product calculator 54 receives the received signal $X_1(f+FDOA_{12,k}-(FDOA_{11,i}-FDOA_{22,j}))$ having been subjected to the frequency-shifting process and the received signal $X_2(f)$ of the antenna 2, which are outputted from the frequency-shifting processor 53, the inner-product calculator 54 calculates an inner product $C_{k,i,j}$ between the received signal $X_1(f+FDOA_{12,k}-(FDOA_{11,i}-FDOA_{22,j}))$ having been subjected to the frequency-shifting process and the received signal $X_2(f)$ of the antenna 2, as shown in the following equation (21) (step ST57):

$$C_{k,i,j}=\langle X_1(f+FDOA_{12,k}-(FDOA_{11,i}-FDOA_{22,j})),X_2\rangle \quad (21)$$

In equation (21), when the value $FDOA_{12,k}$ selected by the FDOA selector 51 results from a multipath wave, as shown in the above-described equation (20), $X_1(f+FDOA_{12,k}-(FDOA_{11,i}-FDOA_{22,j}))$ corresponds to $X_1(f+FDOA_{12,DIRECT})$, and $X_1(f+FDOA_{12,DIRECT})$ is a signal where the received signal $X_1(f)$ is shifted in frequency by the value $FDOA_{12,DIRECT}$ resulting from direct waves, and thus, the inner product between the received signal $X_1(f+FDOA_{12,k}-(FDOA_{11,i}-FDOA_{22,j}))$ and the received signal $X_2(f)$ has a large value.

On the other hand, when the value $FDOA_{12,k}$ selected by the FDOA selector 51 results from direct waves, the inner product between the received signal $X_1(f+FDOA_{12,k}-(TDOA_{11,i}-FDOA_{22,j}))$ and the received signal $X_2(f)$ has a small value.

When the inner-product calculator 54 calculates the inner product $C_{k,i,j}$, the comparison processor 55 compares the inner product $C_{k,i,j}$ with a preset threshold value $C_{th}$, and outputs a result of the comparison to the direct-wave determiner 56 (step ST58).

When the result of the comparison outputted from the comparison processor 55 shows that the inner product $C_{k,i,j}$ is larger than the threshold value $C_{th}$, the direct-wave determiner 56 determines that the value $FDOA_{12,k}$ selected by the FDOA selector 51 is a frequency difference of arrival resulting from a multipath wave.

When the direct-wave determiner 56 determines that the value $FDOA_{12,k}$ selected by the FDOA selector 51 is a frequency difference of arrival resulting from a multipath wave, if the value of the variable k has not reached K yet (step ST60), the direct-wave determiner 56 increments the variable k by one and then outputs the variable k to the FDOA selector 51 and instructs to reselect the k-th $FDOA_{12,k}$.

By this, the FDOA selector 51 selects the k-th $FDOA_{12,k}$ that has not yet been selected, from among the K values $FDOA_{12,k}$ (k=1, ..., K) calculated by the cross-correlation processor 31, by which the processes at steps ST54 to ST58 are repeated.

When the result of the comparison outputted from the comparison processor 55 shows that the inner product $C_{k,i,j}$ is smaller than the threshold value $C_{th}$, there is the possibility that the value $FDOA_{12,k}$ selected by the FDOA selector 51 is a frequency difference of arrival resulting from direct waves emitted from the radio source. Thus, if the value of the variable j has not reached J yet, the direct-wave determiner 56 increments the variable j by one and then outputs the variable i and the variable j to the FDOA selector 52 and instructs to reselect the i-th $FDOA_{11,i}$ and the j-th $FDOA_{22,j}$.

On the other hand, if the value of the variable j has already reached J, the variable j is initialized to 1 and the variable i is incremented by one and then the variable i and the variable j are outputted to the FDOA selector 52 and selection of the i-th $FDOA_{11,i}$ and the j-th $FDOA_{22,j}$ is instructed.

Namely, the direct-wave determiner 56 allows the processes at steps ST55 to ST58 to be repeatedly performed until all combinations of the I values $FDOA_{11,i}$ (i=1, ..., I) and the J values $FDOA_{22,j}$ (j=1, ..., J) which are calculated by the autocorrelation processor 32 are selected and results of comparisons made by the comparison processor 55 are obtained (step ST59).

The direct-wave determiner 56 determines that the value $FDOA_{12,k}$ selected by the FDOA selector 51 is a frequency difference of arrival resulting from direct waves emitted from the radio source, when a result of a comparison made by the comparison processor 55 shows that the inner product $C_{k,i,j}$ is smaller than the threshold value $C_{th}$ for all combinations of the values $FDOA_{11,i}$ and $FDOA_{22,j}$ selected by the FDOA selector 52.

When the direct-wave determiner 56 determines whether the value $FDOA_{12,k}$ selected by the FDOA selector 51 is a frequency difference of arrival resulting from direct waves emitted from the radio source, if the value of the variable k has not reached K yet (step ST60), the direct-wave determiner 56 increments the variable k by one and then outputs the variable k to the FDOA selector 51 and instructs to reselect the k-th $FDOA_{12,k}$.

By this, the FDOA selector 51 selects the k-th $FDOA_{12,k}$ that has not yet been selected, from among the K values $FDOA_{12,k}$ (k=1, ..., K) calculated by the cross-correlation processor 31, by which the processes at steps ST54 to ST58 are repeated.

By the above, it is determined whether the K values $FDOA_{12,k}$ (k=1, ..., K) calculated by the cross-correlation processor 31 are frequency differences of arrival resulting from direct waves emitted from the radio source.

The positioning processor 34 calculates the location of the radio source, using the values $FDOA_{12,k}$ that are determined by the determination processor 33 to be frequency differences of arrival resulting from direct waves among the values $FDOA_{12,k}$ calculated by the cross-correlation processor 31. A radio-source positioning process itself is a publicly known technique and thus a detailed description thereof is omitted.

Although here the number of radio sources is one for simplification of description, when the number of radio sources is plural, the number of peaks in a cross-correlation and the number of peaks in autocorrelations just increase, and accordingly, the number of the values $FDOA_{12,k}$ calculated by the cross-correlation processor 31 and the numbers of the values $FDOA_{11,i}$ and $FDOA_{22,j}$ calculated by the autocorrelation processor 32 just increase.

Therefore, as with the case in which the number of radio sources is one, by examining all combinations of the values $FDOA_{11,i}$ and $FDOA_{22,j}$ calculated by the autocorrelation processor 32, it can be determined whether each of the values $FDOA_{12,k}$ calculated by the cross-correlation processor 31 is a frequency difference of arrival resulting from direct waves.

As is clear from the above, according to the sixth embodiment, it is configured such that the determination processor 33 is provided that determines, using the values $FDOA_{11,i}$ and $FDOA_{22,j}$ calculated by the autocorrelation processor 32, whether the values $FDOA_{12,k}$ calculated by the cross-correlation processor 31 are frequency differences of arrival resulting from direct waves emitted from a radio source, and the positioning processor 34 calculates the location of the radio source, using the values $FDOA_{12,k}$ that are determined by the determination processor 33 to be frequency differences of arrival resulting from direct waves and selected from among the values $FDOA_{12,k}$ calculated by the cross-correlation processor 31. Thus, an effect is provided that allows to calculate, even under an environment where there are two or more unknown radio sources, the locations of the radio sources with high accuracy, using FDOAs resulting from direct waves.

Sixth Embodiment

The above-described fifth embodiment shows that a frequency-shifting processor 53 performs a frequency-shifting process where the shift frequency ($FDOA_{12,k}-(FDOA_{11,i}-FDOA_{22,j})$) for the received signal $X_1(f)$ of an antenna 1 is calculated using the value $FDOA_{12,k}$ selected by an FDOA selector 51 and the values $FDOA_{11,i}$ and $FDOA_{22,j}$ selected by an FDOA selector 52, and the received signal $X_1(f)$ of the antenna 1 is shifted upward in frequency by the shift frequency. Alternatively, the frequency-shifting processor 53 may calculate a shift frequency ($FDOA_{12,k}-FDOA_{11,i}$) for a received signal $X_1(f)$ of the antenna 1, using the value $FDOA_{12,k}$ selected by the FDOA selector 51 and the value $FDOA_{11,i}$ selected by the FDOA selector 52, and shift upward in frequency the received signal $X_1(f)$ of the antenna 1 by the shift frequency ($FDOA_{12,k}-FDOA_{11,i}$) and shift a received signal $X_2(f)$ of an antenna 2 downward in frequency by the value $FDOA_{22,j}$ selected by the FDOA selector 52.

A specific operation is as follows.

The frequency-shifting processor 53 performs a frequency-shifting process by calculating a shift frequency ($FDOA_{12,k}-FDOA_{11,i}$) for a received signal $X_1(f)$ of the antenna 1 using the value $FDOA_{12,k}$ selected by the FDOA selector 51 and the value $FDOA_{11,i}$ selected by the FDOA selector 52, and shifting the received signal $X_1(f)$ of the antenna 1 upward in frequency by the shift frequency ($FDOA_{12,k}-FDOA_{11,i}$) as shown in the following formula (22):

$$X_1(f+FDOA_{12,k}-FDOA_{11,1}) \quad (22)$$

In addition, the frequency-shifting processor 53 performs a frequency-shifting process by setting the value $FDOA_{22,j}$ selected by the FDOA selector 52 as a shift frequency ($FDOA_{22,j}$) for a received signal $X_2(f)$ of the antenna 2, and shifting the received signal $X_2(f)$ of the antenna 2 downward in frequency by the shift frequency ($FDOA_{22,j}$) as shown in the following formula (23):

$$X_2(f-FDOA_{22,j}) \quad (23)$$

When an inner-product calculator 54 receives from the frequency-shifting processor 53 the received signal $X_1(f+FDOA_{12,k}-FDOA_{11,i})$ having been subjected to the frequency-shifting process and the received signal $X_2(f-FDOA_{22,j})$ having been subjected to the frequency-shifting process, the inner-product calculator 54 calculates an inner product $C_{k,i,j}$ between the received signal $X_1(f+FDOA_{12,k}-FDOA_{11,i})$ having been subjected to the frequency-shifting process and the received signal $X_2(f-FDOA_{22,j})$ having been subjected to the frequency-shifting process, as shown in the following equation (24):

$$C_{k,i,j}=<(f+FDOA_{12,k}-FDOA_{11,i}),X_2(f-FDOA_{22,j})> \quad (24)$$

The sixth embodiment differs from the fifth embodiment in that while in the fifth embodiment the frequency-shifting processor 53 shifts in frequency only the received signal $X_1(f)$ of the antenna 1, in the sixth embodiment the frequency-shifting processor 53 shifts in frequency not only the received signal $X_1(f)$ of the antenna 1 but also the received signal $X_2(f)$ of the antenna 2. A total amount of frequency-shift for the two received signals $X_1(f)$ and $X_2(f)$ is equal to ($FDOA_{12,k}-(FDOA_{11,i}-FDOA_{22,j})$) in both embodiments.

Therefore, when the value $FDOA_{12,k}$ selected by the FDOA selector 51 results from a multipath wave, the inner product $C_{k,i,j}$ of the received signal $X_1(f+FDOA_{12,k}-FDOA_{11,i})$ having been subjected to the frequency-shifting process and the received signal $X_2(f-FDOA_{22,j})$ having been subjected to the frequency-shifting process has a large value as with the inner product $C_{k,i,j}$ calculated in the fifth embodiment.

On the other hand, when the value $FDOA_{12,k}$ selected by the FDOA selector 51 results from direct waves, the inner product $C_{k,i,j}$ of the received signal $X_1(f+FDOA_{12,k}-FDOA_{11,i})$ having been subjected to the frequency-shifting process and the received signal $X_2(f-FDOA_{22,j})$ having been subjected to the frequency-shifting process has a small value as with the inner product $C_{k,i,j}$ calculated in the fifth embodiment.

Processing content of the comparison processor 55 and the direct-wave determiner 56 is the same as that of the fifth embodiment and thus description thereof is omitted.

By the above, even if the frequency-shifting processor 53 shifts in frequency two received signals $X_1(f)$ and $X_2(f)$ such that a total amount of frequency-shift for the received signal $X_1(f)$ of the antenna 1 and the received signal $X_2(f)$ of the antenna 2 is equal to the value $FDOA_{12,DIRECT}$ resulting from direct waves, as in the above-described fifth embodiment, the effect is provided that allows to calculate, even under an environment where there are two or more unknown radio sources, the locations of the radio sources with high accuracy, using FDOAs resulting from direct waves.

Seventh Embodiment

The above-described fifth embodiment shows that there are provided a frequency-shifting processor 53 that shift a received signal $X_1(f)$ of an antenna 1 upward in frequency by the shift frequency ($FDOA_{12,k}-(FDOA_{11,i}-FDOA_{22,j})$) and the inner-product calculator 54 that calculates the inner product $C_{k,i,j}$ between the received signal $X_1(f+FDOA_{12,k}-(FDOA_{11,i}-FDOA_{22,j}))$ having been subjected to the frequency-shifting process and a received signal $X_2(f)$ of an antenna 2, and it is determined that the value $FDOA_{12,k}$ selected by an FDOA selector 51 is a frequency difference of arrival resulting from direct waves, when the inner product $C_{k,i,j}$ calculated by the inner-product calculator 54 is smaller than a threshold value $C_{th}$. Alternatively, it may be determined that the value $FDOA_{12,k}$ selected by the FDOA selector 51 is a frequency difference of arrival resulting from direct waves, when there is no peak at the position of a frequency of ($FDOA_{12,k}-(FDOA_{11,i}-FDOA_{22,j})$) in the cross-correlation $CCF(X_1(f), X_2(f))$ calculated by a cross-correlation processor 31.

Figure 18:
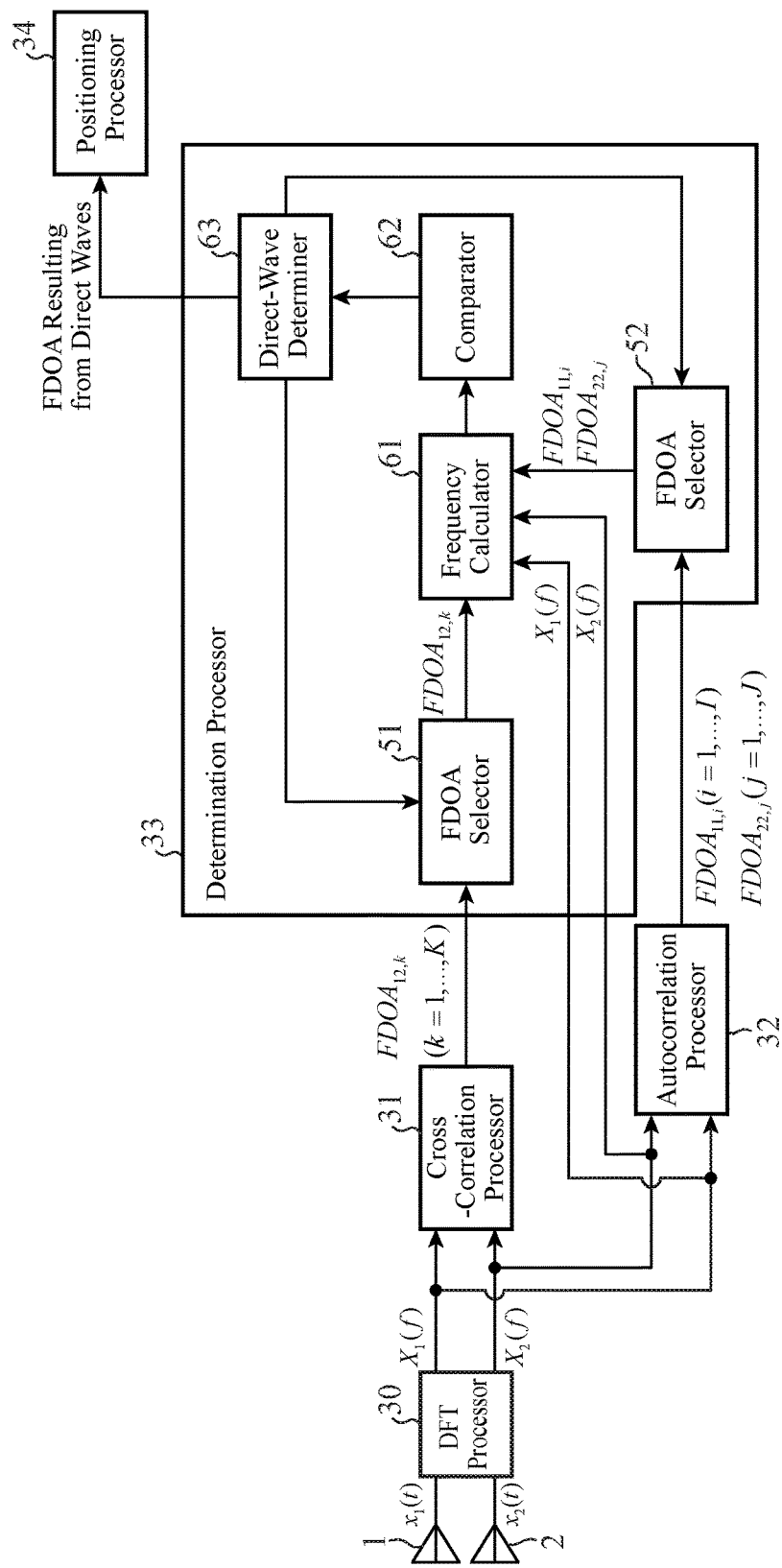
FIG. 18 is a configuration diagram showing a positioning device according to a seventh embodiment of the invention.

FIG. 18 is a configuration diagram showing a positioning device according to a seventh embodiment of the invention, and in the drawing the same reference signs as those in FIG. 16 indicate the same or corresponding portions and thus description thereof is omitted.

A frequency calculator 61 performs a process of calculating a frequency of $(FDOA_{12,k}-(FDOA_{11,i}-FDOA_{22,j}))$, using the value $FDOA_{12,k}$ selected by an FDOA selector 51 and the values $FDOA_{11,i}$ and $FDOA_{22,j}$ selected by an FDOA selector 52.

A comparison processor 62 performs a process of obtaining a cross-correlation value $P_{k,i,j}$ at the position of the frequency $(FDOA_{12,k}-(FDOA_{11,i}-FDOA_{22,j}))$ calculated by the frequency calculator 61 from the cross-correlation CCF $(X_1(f), X_2(f))$ calculated by a cross-correlation processor 31, and comparing the cross-correlation value $P_{k,i,j}$ with a preset threshold value $P_{th}$.

A direct-wave determiner 63 determines that the value $FDOA_{12,k}$ selected by the FDOA selector 51 is a frequency difference of arrival resulting from direct waves emitted from a radio source, when a result of a comparison made by the comparison processor 62 shows that the cross-correlation value $P_{k,i,j}$ is smaller than the threshold value $P_{th}$ for all combinations of the values $FDOA_{11,i}$ and $FDOA_{22,j}$ selected by the FDOA selector 52.

Note that the comparison processor 62 and the direct-wave determiner 63 compose a determining unit.

Figure 19:
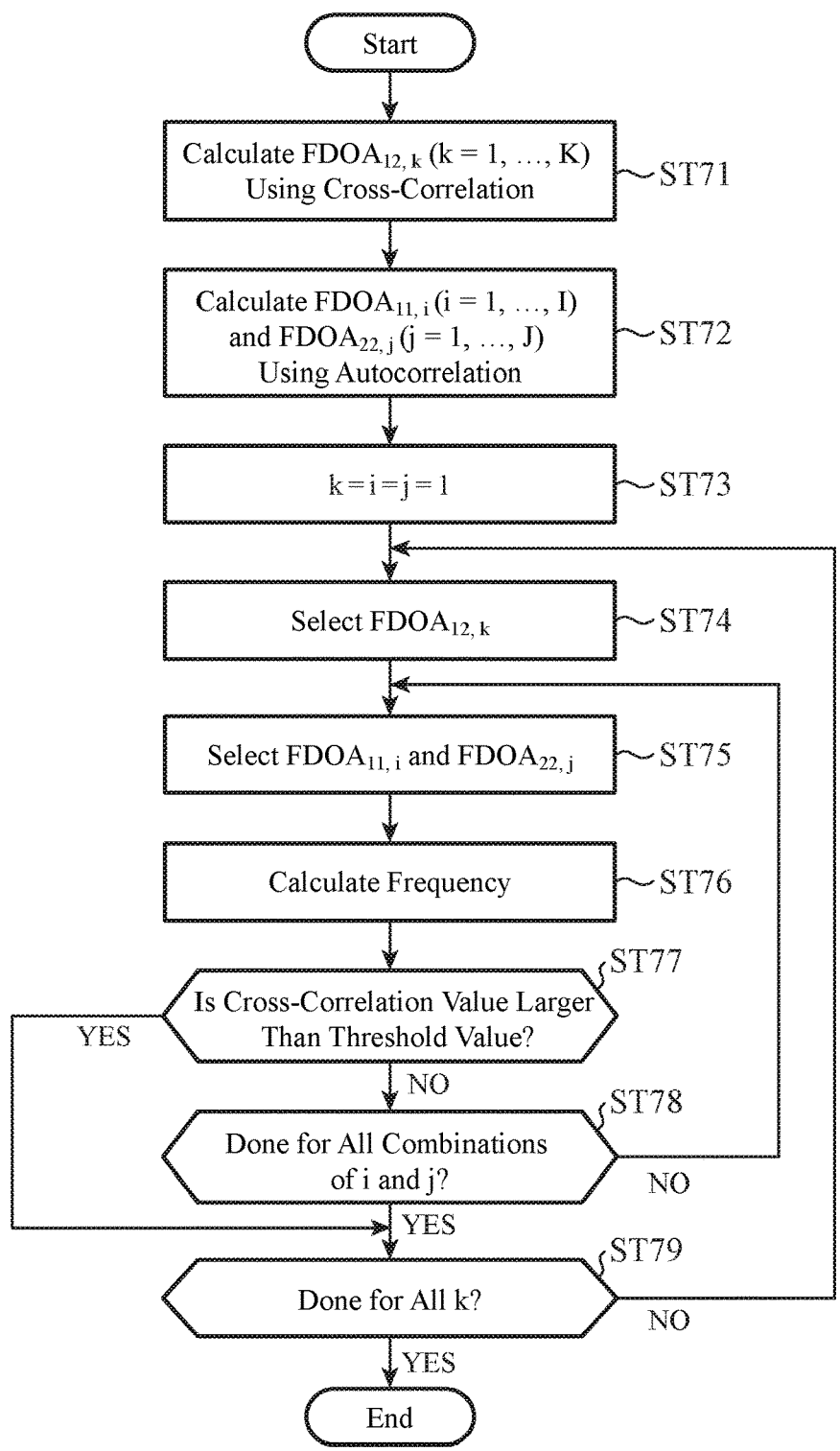
FIG. 19 is a flowchart showing processing content of the positioning device according to the seventh embodiment of the invention.
Figure 20:
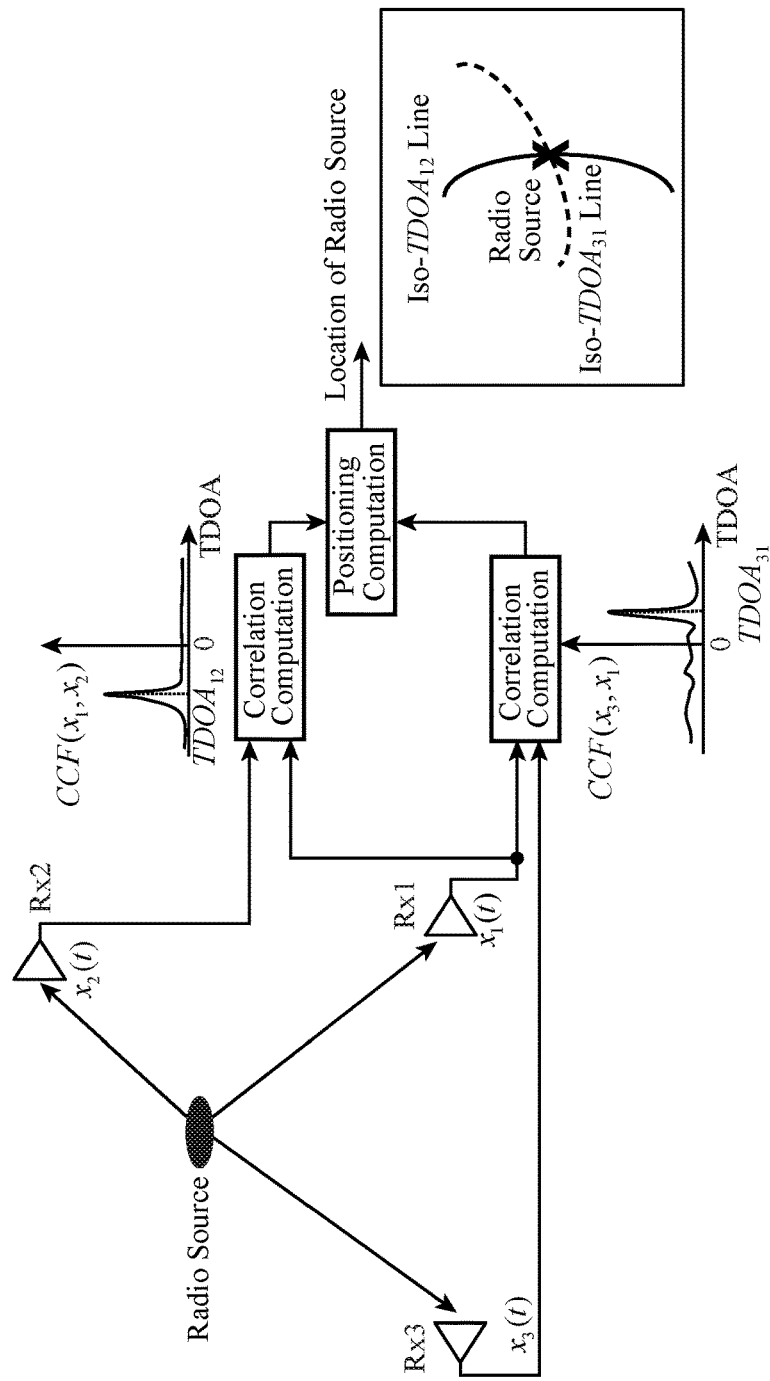
FIG. 20 is an illustrative diagram showing an overview of TDOA positioning disclosed in Non-Patent Literature 1.

FIG. 19 is a flowchart showing processing content of the positioning device according to the seventh embodiment of the invention.

Next, an operation will be described.

When the cross-correlation processor 31 receives from a DFT processor 30 a received signal $X_1(f)$ of an antenna 1 and a received signal $X_2(f)$ of an antenna 2 that have been subjected to the transform into frequency domain, as with the above-described fifth embodiment, the cross-correlation processor 31 calculates cross-correlation CCF$(X_1(f), X_2(f))$ between the received signal $X_1(f)$ and the received signal $X_2(f)$.

When the cross-correlation processor 31 calculates the cross-correlation CCF$(X_1(f), X_2(f))$, the cross-correlation processor 31 searches for peak values of the cross-correlation CCF$(X_1(f), X_2(f))$ and outputs frequencies corresponding to the peak values to a determination processor 33, as frequency differences of arrival $(FDOA_{12,k}$ (k=1, ..., K)) between signal waves (a direct wave and a multipath wave) contained in the received signal $X_1(f)$ and signal waves (a direct wave and a multipath wave) contained in the received signal $X_2(f)$ (step ST71).

When an autocorrelation processor 32 receives from the DFT processor 30 the received signal $X_1(f)$ of the antenna 1 and the received signal $X_2(f)$ of the antenna 2 that have been subjected to the transform into frequency domain, as with the above-described fifth embodiment, the autocorrelation processor 32 calculates the autocorrelation ACF$(X_1(f), X_1(f))$ of the received signal $X_1(f)$ of the antenna 1, and calculates the autocorrelation ACF$(X_2(f), X_2(f))$ of the received signal $X_2(f)$ of the antenna 2.

When the autocorrelation processor 32 calculates the autocorrelation ACF$(X_1(f), X_1(f))$ of the received signal $X_1(f)$ of the antenna 1, the autocorrelation processor 32 searches for peak values of the autocorrelation ACF $(X_1(f), X_1(f))$ and outputs frequencies corresponding to the peak values to the determination processor 33, as frequency differences of arrival $(FDOA_{11,i}$ (i=1, ..., I)) between a plurality of signal waves (a direct wave and a multipath wave) contained in the received signal $X_1(f)$ (step ST72).

In addition, the autocorrelation processor 32 searches for peak values of the autocorrelation ACF$(X_2(f), X_2(f))$ of the received signal $X_2(f)$ of the antenna 2 and outputs frequencies corresponding to the peak values to the determination processor 33, as frequency differences of arrival $(FDOA_{22,j}$ (j=1, ..., J)) between a plurality of signal waves (a direct wave and a multipath wave) contained in the received signal $X_2(f)$ (step ST72).

When the cross-correlation processor 31 calculates K number of values $FDOA_{12,k}$ (k=1, ..., K) and the autocorrelation processor 32 calculates I number of values $FDOA_{11,i}$ (i=1, ..., I) and J number of values $FDOA_{22,j}$ (j=1, ..., J), the direct-wave determiner 63 in the determination processor 33 initializes variables k, i, and j to 1 (step ST73).

The FDOA selector 51 selects the k-th $FDOA_{12,k}$ that has not yet been selected, from among the K values $FDOA_{12,k}$ (k=1, ..., K) calculated by the cross-correlation processor 31 (step ST74). At this stage, k=1 and thus the value $FDOA_{12,1}$ is selected.

The FDOA selector 52 selects the i-th $FDOA_{11,i}$ that has not yet been selected, from among the I values $FDOA_{11,i}$ (i=1, ..., I) calculated by the autocorrelation processor 32 (step ST75). At this stage, i=1 and thus the value $FDOA_{11,1}$ is selected.

In addition, the FDOA selector 52 selects the j-th $FDOA_{22,j}$ that has not yet been selected, from among the J values $FDOA_{22,j}$ (j=1, ..., J) calculated by the autocorrelation processor 32 (step ST75). At this stage, j=1 and thus the value $FDOA_{22,1}$ is selected.

When the FDOA selector 51 selects the value $FDOA_{12,k}$ and the FDOA selector 52 selects the values $FDOA_{11,i}$ and $FDOA_{22,j}$, the frequency calculator 61 calculates a frequency of $(FDOA_{12,k}-(FDOA_{11,i}-FDOA_{22,j}))$, using the values $FDOA_{12,k}$, $FDOA_{11,i}$ and $FDOA_{22,j}$ (step ST76).

When the frequency calculator 61 calculates the frequency $(FDOA_{12,k}-(FDOA_{11,i}-FDOA_{22,j}))$, the comparison processor 62 obtains a cross-correlation value $P_{k,i,j}$ at the position of the frequency $(FDOA_{12,k}-(FDOA_{11,i}-FDOA_{22,j}))$ from the cross-correlation CCF $(X_1(f), X_2(f))$ calculated by the cross-correlation processor 31, compares the cross-correlation value $P_{k,i,j}$ with a preset threshold value $P_{th}$, and outputs a result of the comparison to the direct-wave determiner 63 (step ST77).

Although here the comparison processor 62 compares the cross-correlation value $P_{k,i,j}$ with the threshold value $P_{th}$, since the cross-correlation value $P_{k,i,j}$ has the same value as an inner product $C_{k,i,j}$ of equation (21) which is calculated by an inner-product calculator 54 of the above-described fifth embodiment, comparing the cross-correlation value $P_{k,i,j}$ with the threshold value $P_{th}$ is equivalent to comparing the inner product $C_{k,i,j}$ with a threshold value $C_{th}$.

The direct-wave determiner 63 determines that the value $FDOA_{12,k}$ selected by the FDOA selector 51 is a frequency difference of arrival resulting from a multipath wave, when the result of the comparison outputted from the comparison processor 62 shows that the cross-correlation value $P_{k,i,j}$ is larger than the threshold value $P_{th}$.

When the direct-wave determiner 63 determines that the value $FDOA_{12,k}$ selected by the FDOA selector 51 is a frequency difference of arrival resulting from a multipath wave, if the value of the variable k has not reached K yet (step ST79), the direct-wave determiner 63 increments the variable k by one and then outputs the variable k to the FDOA selector 51 and instructs to reselect the k-th $FDOA_{12,k}$.

By this, the FDOA selector 51 selects the k-th $FDOA_{12,k}$ that has not yet been selected, from among the K values $FDOA_{12,k}$ (k=1, ..., K) calculated by the cross-correlation processor 31, by which the processes at steps ST74 to ST77 are repeated.

When the result of the comparison outputted from the comparison processor 62 shows that the cross-correlation value $P_{k,i,j}$ is smaller than the threshold value $P_{th}$, there is the possibility that the value $FDOA_{12,k}$ selected by the FDOA selector 51 is a frequency difference of arrival resulting from direct waves emitted from a radio source. Thus, if the value of the variable j has not reached J yet, the direct-wave determiner 63 increments the variable j by one and then outputs the variable i and the variable j to the FDOA selector 52 and instructs to reselect the i-th $FDOA_{11,i}$ and the j-th $FDOA_{22,j}$.

On the other hand, if the value of the variable j has already reached J, the variable j is initialized to 1 and the variable i is incremented by one and then the variable i and the variable j are outputted to the FDOA selector 52 and selection of the i-th $FDOA_{11,i}$ and the j-th $FDOA_{22,j}$ is instructed.

Namely, the direct-wave determiner 63 allows the processes at steps ST75 to ST77 to be repeatedly performed until all combinations of the I values $FDOA_{11,i}$ (i=1, ..., I) and the J values $FDOA_{22,j}$ (j=1, ..., J) which are calculated by the autocorrelation processor 32 are selected and results of comparisons made by the comparison processor 62 are obtained (step ST78).

The direct-wave determiner 63 determines that the value $FDOA_{12,k}$ selected by the FDOA selector 51 is a frequency difference of arrival resulting from direct waves emitted from the radio source, when a result of a comparison made by the comparison processor 62 shows that the cross-correlation value $P_{k,i,j}$ is smaller than the threshold value $P_{th}$ for all combinations of the values $FDOA_{11,i}$ and $FDOA_{22,j}$ selected by the FDOA selector 52.

When the direct-wave determiner 63 determines whether the value $FDOA_{12,k}$ selected by the FDOA selector 51 is a frequency difference of arrival resulting from direct waves emitted from the radio source, if the value of the variable k has not reached K yet (step ST79), the direct-wave determiner 63 increments the variable k by one and then outputs the variable k to the FDOA selector 51 and instructs to reselect the k-th $FDOA_{12,k}$.

By this, the FDOA selector 51 selects the k-th $FDOA_{12,k}$ that has not yet been selected, from among the K values $FDOA_{12,k}$ (k=1, ..., K) calculated by the cross-correlation processor 31, by which the processes at steps ST74 to ST77 are repeated.

By the above, it is determined whether the K values $FDOA_{12,k}$ (k=1, ..., K) calculated by the cross-correlation processor 31 are frequency differences of arrival resulting from direct waves emitted from the radio source.

A positioning processor 34 calculates the location of the radio source, using the values $FDOA_{12,k}$ that are determined by the determination processor 33 to be frequency differences of arrival resulting from direct waves and selected from among the values $FDOA_{12,k}$ calculated by the cross-correlation processor 31.

As is clear from the above, even if it is configured such that it is determined that the value $FDOA_{12,k}$ selected by the FDOA selector 51 is a frequency difference of arrival resulting from direct waves, when there is no peak at the position of a frequency of $(FDOA_{12,k}-(FDOA_{11,i}-FDOA_{22,j}))$ in the cross-correlation $CCF(X_1(f), X_2(f))$ calculated by the cross-correlation processor 31, as with the above-described fifth embodiment, an effect is provided that allows to calculate, under an environment where there are two or more unknown radio sources, the locations of the radio sources with high accuracy, using FDOAs resulting from direct waves. In addition, an effect is provided that allows to reduce computation load over that of the fifth embodiment.

Eighth Embodiment

The above-described seventh embodiment shows that a frequency calculator 61 calculates a frequency of $(FDOA_{12,k}-(FDOA_{11,i}-FDOA_{22,j}))$ and it is determined that the value $FDOA_{12,k}$ selected by an FDOA selector 51 is a frequency difference of arrival resulting from direct waves, when there is no peak at the position of the frequency $(FDOA_{12,k}-(FDOA_{11,i}-FDOA_{22,j}))$ calculated by the frequency calculator 61 in the cross-correlation $CCF(X_1(f), X_2(f))$ calculated by a cross-correlation processor 31. Alternatively, the frequency calculator 61 may calculate a frequency of $(FDOA_{22,j}-FDOA_{11,i})$ and it may be determined that the value $FDOA_{12,k}$ selected by the FDOA selector 51 is a frequency difference of arrival resulting from direct waves, when there is no peak at the position of the frequency $(FDOA_{22,j}-FDOA_{11,i})$ calculated by the frequency calculator 61 in the cross-correlation $CCF(X_1(f+FDOA_{12,k}), X_2(f))$ between a received signal $X_1(f+FDOA_{12,k})$ of an antenna 1 whose frequency is increased by the value $FDOA_{12,k}$ selected by the FDOA selector 51 and a received signal $X_2(f)$ of an antenna 2.

A specific operation is as follows.

When an FDOA selector 52 selects the values $FDOA_{11,i}$ and $FDOA_{22,j}$, the frequency calculator 61 calculates a frequency of $(FDOA_{22,j}-FDOA_{11,i})$, using the values $FDOA_{11,i}$ and $FDOA_{22,j}$.

When the frequency calculator 61 calculates the frequency $(FDOA_{22,j}-FDOA_{11,i})$, a comparison processor 62 performs a frequency shifting process by shifting a received signal $X_1(f)$ of the antenna 1 upward in frequency by the value $FDOA_{12,k}$ selected by the FDOA selector 51, and calculates a cross-correlation $CCF(X_1(f+FDOA_{12,k}), X_2(f))$ between the received signal $X_1(f+FDOA_{12,k})$ of the antenna 1 having been subjected to the frequency-shifting process and a received signal $X_2(f)$ of the antenna 2.

When the comparison processor 62 calculates the cross-correlation CCF $(X_1(f+FDOA_{12,k}), X_2(f))$, the comparison processor 62 obtains a cross-correlation value $P_{k,i,j}$ at the position of the frequency $(FDOA_{22,j}-FDOA_{11,i})$ calculated by the frequency calculator 61 from the cross-correlation CCF $(X_1(f+FDOA_{12,k}), X_2(f))$, compares the cross-correlation value $P_{k,i,j}$ with a preset threshold value $P_{th}$, and outputs a result of the comparison to a direct-wave determiner 63.

Although here the comparison processor 62 compares the cross-correlation value $P_{k,i,j}$ with the threshold value $P_{th}$, since the cross-correlation value $P_{k,i,j}$ has the same value as an inner product $C_{k,i,j}$ of equation (24) which is calculated by an inner-product calculator 54 of the above-described sixth embodiment, comparing the cross-correlation value $P_{k,i,j}$ with the threshold value $P_{th}$ is equivalent to comparing the inner product $C_{k,i,j}$ with a threshold value $C_{th}$.

Processing content of the direct-wave determiner 63 is the same as that of the above-described seventh embodiment and thus a detailed description thereof is omitted.

By the above, even if it is determined that the value $FDOA_{12,k}$ selected by the FDOA selector 51 is a frequency difference of arrival resulting from direct waves, when there is no peak at the position of a frequency $(FDOA_{22,j}-FDOA_{11,i})$ calculated by the frequency calculator 61 in the cross-correlation CCF $(X_1(f+FDOA_{12,k}), X_2(f))$ between a received signal $X_1(f+FDOA_{12,k})$ of the antenna 1 whose frequency is increased by the value $FDOA_{12,k}$ and a received signal $X_2(f)$ of the antenna 2, as with the above-described seventh embodiment, an effect is provided that allows to calculate, even under an environment where there are two or more unknown radio sources, the locations of the radio sources with high accuracy, using FDOAs resulting from direct waves.

Note that in the invention of the present application, free combination of the embodiments, or modifications to any component of the embodiments, or omission of any component of the embodiments may be made without departing from the spirit and scope of the invention.

INDUSTRIAL APPLICABILITY

Positioning devices according to the invention are suitable for a case in which even under an environment where there are two or more unknown radio sources, the location of the radio sources need to be calculated with high accuracy.

REFERENCE SIGNS LIST

1: antenna (first antenna), 2: antenna (second antenna), 3: cross-correlation processor (first time-difference-of-arrival calculator), 4: autocorrelation processor (second time-difference-of-arrival calculator), 5: determination processor (determiner), 6: positioning processor (location calculator), 11 and 12: TDOA selectors (time shifter), 13: time-shifter, 14: inner-product calculator, 15: comparator (determining unit), 16: direct-wave determiner (determining unit), 21: time calculator, 22: comparator (determining unit), 23: direct-wave determiner (determining unit), 30: DFT processor, 31: cross-correlation processor (first frequency-difference-of-arrival calculator), 32: autocorrelation processor (second frequency-difference-of-arrival calculator), 33: determination processor (determiner), 34: positioning processor (location calculator), 51 and 52: FDOA selectors (frequency shifters), 53: frequency-shifting processor (frequency shifter), 54: inner-product calculator, 55: comparator (determining unit), 56: direct-wave determiner (determining unit), 61: frequency calculator, 62: comparator (determining unit), and 63: direct-wave determiner (determining unit).

The invention claimed is:

1. A positioning device comprising:
   a plurality of antennas including first and second antennas to receive signals in each of which a direct wave and a multipath wave interfere with each other, the direct wave and the multipath wave being emitted from a radio source;
   a first time-difference-of-arrival calculator to calculate time differences of arrival between signal waves being contained in the first and second received signals, based on a cross-correlation between a first received signal received by the first antenna and a second received signal received by the second antenna;
   a second time-difference-of-arrival calculator to calculate a time difference of arrival between signal waves being contained in the first received signal, based on an autocorrelation of the first received signal and to calculate a time difference of arrival between signal waves being contained in the second received signal, based on an autocorrelation of the second received signal;
   a determiner to determine, using a difference between the time difference of arrival calculated based on the autocorrelation of the first received signal by the second time-difference-of-arrival calculator and the time difference of arrival calculated based on the autocorrelation of the second received signal by the second time-difference-of-arrival calculator, whether the time differences of arrival calculated by the first time-difference-of-arrival calculator are time differences of arrival resulting from direct waves emitted from the radio source; and
   a location calculator to calculate a location of the radio source, using the time differences of arrival determined by the determiner as being the time differences of arrival resulting from the direct waves and selected from among the time differences of arrival calculated by the first time-difference-of-arrival calculator.

2. The positioning device according to claim 1, wherein the determiner includes:
   a time shifter to calculate a time-shifted signal by shifting the first received signal forward in time by an amount of time that is obtained by subtracting the difference from a time difference of arrival calculated by the first time-difference-of-arrival calculator;
   an inner-product calculator to calculate an inner product between the time-shifted signal and the second received signal; and
   a determining unit to, when the inner product calculated by the inner-product calculator is smaller than a preset threshold value, determine that the time difference of arrival calculated by the first time-difference-of-arrival calculator is a time difference of arrival resulting from the direct waves emitted from the radio source.

3. The positioning device according to claim 1, wherein the determiner includes:
   a time calculator to calculate an amount of time by subtracting the difference from a time difference of arrival calculated by the first time-difference-of-arrival calculator; and
   a determining unit to, when there is no peak at a position represented by the amount of time calculated by the time calculator in the cross-correlation between the first received signal and the second received signal, determine that the time difference of arrival calculated by the first time-difference-of-arrival calculator is a time difference of arrival resulting from the direct waves emitted from the radio source.

4. The positioning device according to claim 1, wherein the determiner includes:
   a time calculator to calculate an amount of time as the difference by subtracting, from a time difference of arrival calculated based on the autocorrelation of the second received signal by the second time-difference-of-arrival calculator, a time difference of arrival calculated based on the autocorrelation of the first received signal by the second time-difference-of-arrival calculator; and
   a determining unit to calculate a time-shifted signal by shifting the first received signal forward in time by the time difference of arrival calculated by the first time-difference-of-arrival calculator, and to, when there is no peak at a position represented by the amount of time calculated by the time calculator in a cross-correlation between the second received signal and the time-shifted signal, determine that the time difference of arrival calculated by the first time-difference-of-arrival calculator is a time difference of arrival resulting from the direct waves emitted from the radio source.

5. A positioning device comprising:
   a plurality of antennas including first and second antennas to receive signals in each of which a direct wave and a multipath wave interfere with each other, the direct wave and the multipath wave being emitted from a radio source;

a first time-difference-of-arrival calculator to calculate, based on a cross-correlation between a first received signal received by the first antenna and a second received signal received by the second antenna, time differences of arrival between signal waves being contained in the first and second received signals;

a second time-difference-of-arrival calculator to calculate a time difference of arrival between signal waves being contained in the first received signal, based on an autocorrelation of the first received signal, and to calculate a time difference of arrival between signal waves being contained in the second received signal, based on an autocorrelation of the second received signal;

a determiner to determine whether the time differences of arrival calculated by the first time-difference-of-arrival calculator are time differences of arrival resulting from direct waves emitted from the radio source; and a location calculator to calculate a location of the radio source, using the time differences of arrival determined by the determiner as being the time differences of arrival resulting from the direct waves and selected from among the time differences of arrival calculated by the first time-difference-of-arrival calculator, the determiner including:

a time shifter to calculate a time-shifted signal by shifting the first received signal forward in time by an amount of time that is obtained by subtracting, from a time difference of arrival calculated by the first time-difference-of-arrival calculator, a time difference of arrival calculated based on the autocorrelation of the first received signal by the second time-difference-of-arrival calculator, and to calculate a delayed signal by delaying the second received signal in time by a time difference of arrival calculated based on the autocorrelation of the second received signal by the second time-difference-of-arrival calculator;

an inner-product calculator to calculate an inner product between the time-shifted signal and the delayed signal; and a determining unit to, when the inner product calculated by the inner-product calculator is smaller than a preset threshold value, determine that the time difference of arrival calculated by the first time-difference-of-arrival calculator is a time difference of arrival resulting from the direct waves emitted from the radio source.

\* \* \* \* \*